(12) United States Patent
Imamura et al.

(10) Patent No.: US 9,175,583 B2
(45) Date of Patent: Nov. 3, 2015

(54) CONTROL DEVICE FOR INTERNAL COMBUSTION ENGINE

(75) Inventors: Toshio Imamura, Okazaki (JP); Yoshiaki Miyazato, Toyota (JP); Yuu Yokoyama, Okazaki (JP); Masaki Numakura, Toyota (JP); Yoshiki Endo, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 283 days.

(21) Appl. No.: 13/979,889

(22) PCT Filed: Jan. 20, 2011

(86) PCT No.: PCT/JP2011/050920
§ 371 (c)(1),
(2), (4) Date: Jul. 16, 2013

(87) PCT Pub. No.: WO2012/098657
PCT Pub. Date: Jul. 26, 2012

(65) Prior Publication Data
US 2013/0291835 A1    Nov. 7, 2013

(51) Int. Cl.
*F01L 1/34* (2006.01)
*F01L 1/344* (2006.01)
*F02D 13/02* (2006.01)
*F02N 11/08* (2006.01)
*F02N 19/00* (2010.01)
*F02M 69/00* (2006.01)

(52) U.S. Cl.
CPC ............... *F01L 1/3442* (2013.01); *F01L 1/34* (2013.01); *F02D 13/02* (2013.01); *F02M 69/00* (2013.01); *F02N 11/0848* (2013.01); *F02N 19/004* (2013.01); *Y02T 10/18* (2013.01)

(58) Field of Classification Search
CPC ...... F01L 1/34; F01L 1/3442; F02D 13/0203; F02D 2041/001
USPC ............ 123/445, 90.15, 90.12, 179.3, 179.16
See application file for complete search history.

(56) References Cited

U.S. PATENT DOCUMENTS

| | | | |
|---|---|---|---|
| 8,272,358 B2 * | 9/2012 | Yoshioka | .................... 123/90.17 |
| 2007/0028880 A1 | 2/2007 | Yuya et al. | |
| 2008/0098990 A1 | 5/2008 | Hiyoshi et al. | |

FOREIGN PATENT DOCUMENTS

| | | |
|---|---|---|
| JP | 2001-041012 A | 2/2001 |
| JP | 2003-035169 A | 2/2003 |
| JP | 2007-040263 A | 2/2007 |
| JP | 2008-111375 A | 5/2008 |
| JP | 2008-297949 A | 12/2008 |
| JP | 2009-167989 A | 7/2009 |

* cited by examiner

*Primary Examiner* — Mahmoud Gimie
(74) *Attorney, Agent, or Firm* — Kenyon & Kenyon LLP

(57) ABSTRACT

When a start-up failure occurs wherein an internal combustion engine equipped with a variable valve device does not transition to complete combustion before a first prescribed period α elapses from the start of cranking in conjunction with fuel injection, a control unit for the internal combustion engine executes a start-up failure process addressing a state wherein the valve timing is different from a specific timing.

11 Claims, 13 Drawing Sheets

CONTROL DEVICE FOR INTERNAL COMBUSTION ENGINE

CROSS REFERENCE TO RELATED APPLICATION

This is a national phase application based on the PCT International Patent Application No. PCT/JP2011/050920 filed on Jan. 20, 2011, the entire contents of which are incorporated herein by reference.

TECHNICAL FIELD

The present invention relates to a control device for an internal combustion engine including a variable valve device and a fixation mechanism. The variable valve device includes a variable mechanism for changing a valve timing of the internal combustion engine. The fixation mechanism is capable of fixing the valve timing at a timing that is between the most advanced timing and the most retarded timing and in which the engine can be started.

BACKGROUND ART

As a device to be mounted on an internal combustion engine, a variable valve device for changing a valve timing of an intake valve and an exhaust valve that are driven to open and close by a camshaft, according to an engine operating state, is known (refer to Patent Document 1, for example).

The structure of a conventional and general variable valve device, including the one described in the Patent Document 1, is shown in FIG. 14. FIG. 14(a) shows the internal structure of a variable valve device 100 from which a cover is removed, and FIG. 14(b) shows the cross-sectional structure taken along line B-B in FIG. 14(a). Incidentally, the rotational direction of a camshaft 200 is shown by arrow RC in FIG. 14(a).

The variable valve device 100 shown in FIG. 14 has two rotating bodies rotating about the same axis of rotation. One of the rotating bodies include a sprocket 101 drivingly connected to a crankshaft via a chain (illustrations omitted), a housing 102 fixed thereto, and the other rotating body includes a vane rotor 103 drivingly connected to the camshaft 200. A plurality of vanes 103A provided on the vane rotor 103 are respectively received in a plurality of housing chambers 105 formed inside the housing 102, and each housing chamber 105 is divided by the corresponding vane 103A into an advancement chamber 106 and a retardation chamber 107. A hydraulic pressure supplied to the advancement chamber 106 and the retardation chamber 107 displaces the vane 103A in the housing chamber 105 and rotates the housing 102 and the vane rotor 103 relative to each other, so that the relative rotational phase of the camshaft 200 relative to the crankshaft, that is, the valve timing is changed.

Further, the variable valve device 100 is provided with a lock mechanism 110 capable of fixing the valve timing at a timing that is between the most retarded timing and the most advanced timing and at which the engine can be started and, more particularly, at a timing capable of starting the engine in a cold start condition (hereinafter referred to as a specific timing). As shown in FIG. 14(b), the lock mechanism 110 includes a recess 112 formed in the sprocket 101, and a lock pin 111 received in a vane 103A to be able to approach and separate from the recess 112. In a space for receiving the lock pin 111 in the vane 103A, a spring 113 for urging the lock pin 111 and a release chamber 114 into which hydraulic oil is supplied with a predetermined hydraulic pressure are formed.

The lock pin 111 is urged by the spring 113 in a direction to be fitted into the recess 112, whereas the lock pin 111 is urged by force based on the pressure of the hydraulic oil supplied to the release chamber 114 in a direction to be pulled out from the recess 112.

When conditions for locking the valve timing at the specific timing are satisfied, such as when an engine stop request is made, the hydraulic oil is drained from the release chamber 114. When the hydraulic pressure of the release chamber 114 is reduced correspondingly to be lower than a release oil pressure, the lock pin 111 fits into the recess 112 by the urging force of the spring 113, and the relative rotation between the vane rotor 103 and the housing 102 is mechanically locked. As a result of this, the valve timing is locked at the specific timing. Consequently, favorable engine startability can be secured at the next engine start-up time as cranking is started while the valve timing is at the specific timing.

Meanwhile, when conditions for releasing the valve timing from the specific timing are satisfied, such as when a change request of the valve timing is made, the hydraulic oil is supplied to the release chamber 114. When the hydraulic pressure of the release chamber 114 is increased correspondingly to be higher than the release oil pressure, the lock pin 111 is pulled out from the recess 112 by the urging force based on the hydraulic pressure, and the locking of the relative rotation between the vane rotor 103 and the housing 102 is released. As the hydraulic oil is selectively supplied to and drained from the advancement chamber 106 and the retardation chamber 107, the valve timing that has been locked at the specific timing is changed to a timing suited for the engine operating state.

PRIOR ART DOCUMENT

Patent Document

Patent Document 1: Japanese Laid-Open Patent Publication No. 2001-041012

SUMMARY OF THE INVENTION

Problems that the Invention is to Solve

Incidentally, in the case where the valve timing is not locked at the specific timing when the engine stop request is made, the operation of the internal combustion engine is stopped while the valve timing is not at the specific timing, such as at the most retarded timing. For this reason, at the next engine start-up time, the cranking is started while the valve timing is not at the specific timing. This may cause deterioration of engine startability, including the cases where the engine starting impossible, a longer period of time is required for the engine start-up, and the like.

Accordingly, it is an object of the present invention to provide a control device for an internal combustion engine that is capable of limiting deterioration of the engine startability resulting from the valve timing that is not at the specific timing at the start of cranking.

Means for Solving the Problems

To achieve the foregoing objective and in accordance with one aspect of the present invention, a control device for an internal combustion engine is provided. The engine includes a variable valve device, which includes a variable mechanism and a fixation mechanism. The variable mechanism has a first rotating body, which rotates in synchronization with one of a crankshaft and a camshaft, and a second rotating body, which rotates in synchronization with the other. The variable mechanism rotates the rotating bodies relative to each other to change a valve timing of a valve driven by the camshaft to open and close. The fixation mechanism is capable of fixing the valve timing at a specific timing that is between a most retarded timing and a most advanced timing by limiting the relative rotation between the rotating bodies. A period elapsed from when cranking accompanied by fuel injection is started is defined as a post-start period. The control device executes start-up failure processing, which addresses a state where the valve timing is at a timing different from the specific timing, when the post-start period is equal to or longer than a first predetermined period α and an engine rotation speed is equal to or slower than a predetermined value, that is, when a start-up failure is caused in which the internal combustion engine does not shift to a complete combustion state. The start-up failure processing reduces a fuel injection amount after when it is determined that a start-up failure has been caused to be smaller than the fuel injection amount of when it is determined that a start-up failure has been caused.

According to the above-described configuration, even when the valve timing is not at the specific timing at the start of the cranking, the resulting deterioration of the engine startability can be limited. Further, according to this aspect of the present invention, fuel is supplied to the internal combustion engine from when the cranking is started. Hence, it is possible to start the internal combustion engine promptly when the valve timing is at a specific timing.

The above-described start-up failure processing can be embodied by employing a mode that reduces the fuel injection amount to be smaller than that of when a start-up failure has been caused, for example. When the fuel injection amount is reduced like this to be smaller than that of when a start-up failure has been caused, it is possible to limit further deterioration of the engine startability due to frequent occurrence of misfiring caused by unburned fuel adhered to an ignition plug as a longer period of time is required to complete the engine start-up. When reducing the fuel injection amount in this manner, the fuel injection amount may be reduced while injecting the fuel, or while stopping the fuel injection itself, that is, by setting the fuel injection amount as zero.

The variable mechanism preferably changes the valve timing by rotating the rotating bodies relative to each other based on a hydraulic pressure of hydraulic oil. The fixation mechanism preferably includes a lock pin provided in the first rotating body and a recess provided in the second rotating body, into which the lock pin is fitted. The fixation mechanism preferably causes the lock pin to fit into the recess to mechanically lock the relative rotation between the rotating bodies, thereby locking the valve timing at the specific timing. The fixation mechanism preferably pulls out the lock pin from the recess to allow the rotating bodies to rotate relative to each other.

To achieve the foregoing objective and in accordance with another aspect of the present invention, a control device for an internal combustion engine is provided. The engine includes a variable valve device, which includes a variable mechanism and a fixation mechanism. The variable mechanism has a first rotating body, which rotates in synchronization with one of a crankshaft and a camshaft, and a second rotating body, which rotates in synchronization with the other, the variable mechanism rotating the rotating bodies relative to each other to change a valve timing of a valve driven by the camshaft to open and close. The fixation mechanism is capable of fixing the valve timing at a specific timing that is between a most retarded timing and a most advanced timing by limiting the relative rotation between the rotating bodies. The variable mechanism changes the valve timing by rotating the rotating bodies relative to each other based on a hydraulic pressure of hydraulic oil. The fixation mechanism includes a lock pin provided in the first rotating body and a recess provided in the second rotating body, into which the lock pin is fitted. The fixation mechanism causes the lock pin to fit into the recess to mechanically lock the relative rotation between the rotating bodies, thereby locking the valve timing at the specific timing. The fixation mechanism pulls out the lock pin from the recess to allow the rotating bodies to rotate relative to each other. A period elapsed from when the cranking accompanied by fuel injection is started is defined as a post-start period. The control device executes start-up failure processing, which addresses a state where the valve timing is at a timing different from the specific timing, when the post-start period is equal to or longer than a first predetermined period α and an engine rotation speed is equal to or slower than a predetermined value, that is, when a start-up failure is caused in which the internal combustion engine does not shift to a complete combustion state. The start-up failure processing reduces a cranking speed after when it is determined that a start-up failure has been caused to be slower than the cranking speed of when it is determined that a start-up failure has been caused, the cranking speed being a speed at which the crankshaft is rotated by an engine start-up device.

According to the above-described configuration, even when the valve timing is not at the specific timing at the start of the cranking, the resulting deterioration of the engine startability can be limited. Further, since fuel is supplied to the internal combustion engine from when the cranking is started according to this aspect of the present invention, it is possible to start the internal combustion engine promptly when the valve timing is at the specific timing.

When the alternating torque acts on the camshaft and causes the rotating bodies to rotate relative to each other, the relative rotational direction is reversed periodically. Therefore, the state where the lock pin is at the position capable of being fitted in the steps of the recess and the state where the lock pin is at the position incapable of being fitted therein are repeated. Comparison is made between a period of duration during which the lock pin is at the position capable of being fitted into the steps of the recess and a period required for the lock pin to be fitted into the steps of the recess. When the former is shorter than the latter, the lock pin cannot be fitted into the steps of the recess. In consideration of variations in the period required for the lock pin to be fitted into the steps of the recess, it is easier for the lock pin to be fitted into the steps of the recess, and it is easier for the valve timing to be changed promptly to the specific timing, as the period of duration during which the lock pin is at the position capable of being fitted into the steps of the recess becomes longer. Therefore, as described above, when the cranking speed that is used when rotating the crankshaft by an engine start-up device is reduced to be slower than that of when a start-up failure has been caused, it is possible to make a prompt shift to the state where the valve timing is locked at the specific timing PM, and to execute the cranking with the valve timing capable of starting the engine at an earlier stage. Incidentally, the processing to reduce the fuel injection amount and the processing to reduce the cranking speed as described above can be executed together as the start-up failure processing.

During execution of the cranking, the fixation mechanism preferably changes the valve timing from the timing different from the specific timing to the specific timing. In this case, even when the valve timing is not at the specific timing at the start of cranking, the valve timing is changed to the specific timing so that the cranking with the valve timing capable of starting the engine can be executed at an earlier stage.

The recess is preferably arranged in a circumferential direction of the second rotating body and has a plurality of steps with different depths. In this case, the steps and the lock pin function as a ratchet mechanism, which discretely changes the valve timing from the timing different from the specific timing to the specific timing as the lock pin fits into the steps sequentially by the relative rotation between the rotating bodies, which is made based on alternating torque acting on the camshaft.

According to the above-described configuration, the valve timing can be discretely changed to the specific timing as the lock pin fits into the steps of the recess sequentially by the relative rotation between the rotating bodies that is made based on the alternating torque acting on the camshaft. Thus, even when the valve timing is not at the specific timing at the start of the cranking, the valve timing can be changed autonomously to the specific timing based on the alternating torque acting on the camshaft, which makes it possible to limit the deterioration of the engine startability further favorably.

At the time of a cold start, vaporization of the injected fuel is not promoted and its combustion is difficult. Therefore, the period from when the cranking is started until when the internal combustion engine shifts to the complete combustion state is relatively long. Thus, at the time of a cold start and when the valve timing is not at the specific timing at the start of cranking, deterioration of the engine startability becomes even more severe. Further, at the time of a cold start, the temperature of the hydraulic oil is low and its viscosity is high, so that resisting force of the hydraulic oil, generated when the relative rotation is made between the rotating bodies by the alternating torque acting on the camshaft, is increased. As a result of this, the amount of the relative rotation between the rotating bodies that is made when the alternating torque acts on the camshaft is reduced. This makes it difficult to change the valve timing to the specific timing and lock the valve timing at the specific timing during execution of the cranking. Therefore, when the above-described start-up failure processing is executed at the time of a cold start in particular, it is possible to limit the deterioration of the engine startability in a favorable manner under circumstances where the deterioration of the engine startability is easily caused. Whether a cold start is being carried out can be determined when the temperature of the engine is equal to or lower than a predetermined temperature that is set in advance, and the temperature of the engine can be monitored based on the temperature of the engine cooling water, the temperature of the hydraulic oil and the like.

Incidentally, the start-up failure processing like this may be executed immediately when a start-up failure is caused during a series of engine start-up periods from when the cranking is started until when the internal combustion engine shifts to the complete combustion state. Alternatively, a history of start-up failure may be stored when caused and, the start-up failure processing may be executed from when the cranking is started in the next engine start-up on condition that the history of start-up failure caused in the previous engine start-up has been stored.

MODES FOR CARRYING OUT THE INVENTION

First Embodiment

Hereinafter, a control device for an internal combustion engine according to a first embodiment of the present invention will be described with reference to FIGS. 1 to 9.

Figure 1:
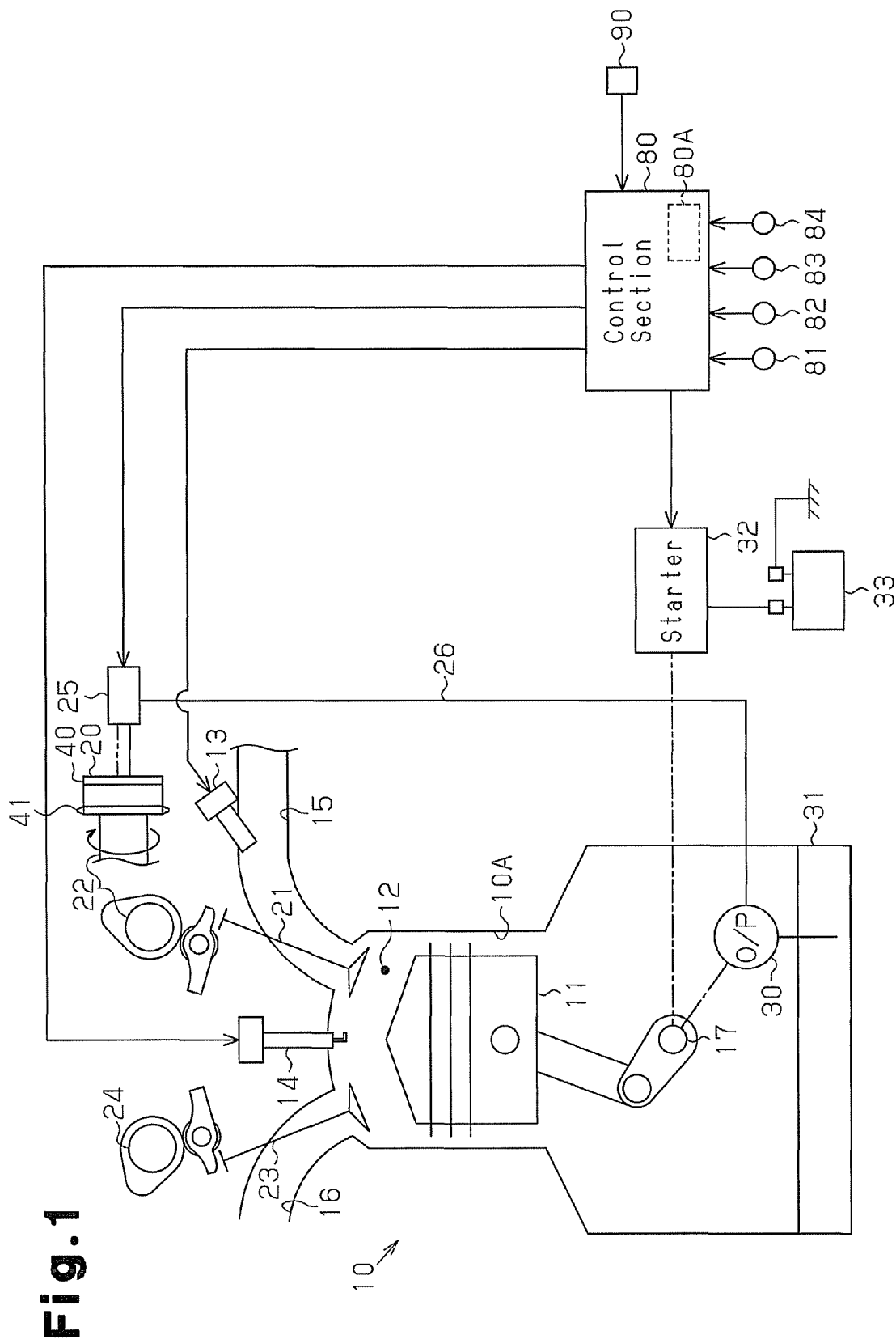
FIG. 1 is a schematic block diagram of a control device for an internal combustion engine and an internal combustion engine to be controlled thereby, according to a first embodiment of the present invention.

As shown in FIG. 1, a piston 11 is received and reciprocates in a cylinder 10A of an internal combustion engine 10. A combustion chamber 12 is defined by a top surface of the piston 11 and an inner periphery of the cylinder 10A. An intake passage 15 for supplying intake air to the combustion chamber 12, and an exhaust passage 16 for discharging exhaust from the combustion chamber 12 are connected to the combustion chamber 12. A fuel injection valve 13 for injecting fuel to the inside of the intake passage 15 is attached to the intake passage 15. Further, an ignition plug 14 for igniting a fuel-air mixture of the intake air and the fuel is provided to the combustion chamber 12.

A crankshaft 17 for converting reciprocating movement of the piston 11 into rotational movement is connected to the above-described piston 11. An intake camshaft 22 for opening and closing an intake valve 21, and an exhaust camshaft 24 for opening and closing an exhaust valve 23 are provided at the top of the internal combustion engine 10. A variable valve device 20 for changing a valve timing of the intake valve 21 is provided at the tip of the intake camshaft 22. A sprocket 41 of the variable valve device 20 is drivingly connected to the crankshaft 17 via a timing chain (not shown). Further, a cover 40 of the variable valve device 20 is provided on the surface opposite to the sprocket 41.

An oil pan 31 for storing hydraulic oil and an oil pump 30, which is driven by rotary power of the crankshaft 17 to pump up the hydraulic oil in the oil pan 31, are provided at the lower portion of the internal combustion engine 10. An oil control valve 25 for changing a supply and drainage state of the hydraulic oil to and from respective oil chambers of the variable valve device 20 is provided to a hydraulic oil passage 26, to which the hydraulic oil is supplied by the oil pump 30. Incidentally, the hydraulic oil stored in the oil pan 31 functions as the hydraulic oil for generating a hydraulic pressure to drive the variable valve device 20, and also functions as lubricating oil for lubricating respective units of the internal combustion engine 10.

In addition, a starter 32 as an engine start-up device, which forcibly rotates (cranks) the crankshaft 17 at a start of the internal combustion engine 10, is connected to the crankshaft 17. Power is supplied to the starter 32 by a battery 33.

Various sensors for detecting an operating state of the internal combustion engine 10 are provided to the internal combustion engine 10. The various sensors include, for example, an engine switch 81, a crank angle sensor 82, a cam angle sensor 83, and a water temperature sensor 84. The engine switch 81 outputs a start signal STSW when operated by a driver making a start request of the internal combustion engine 10. The crank angle sensor 82 is provided near the crankshaft 17 to detect a crank angle CA and an engine rotation speed NE. The cam angle sensor 83 is provided near the camshaft 22 to detect the position of the camshaft 22. The water temperature sensor 84 detects the temperature of cooling water of the internal combustion engine 10 (engine cooling water temperature) TW. The signals output from the various sensors are taken into a control section 80 that integrally controls various units of the internal combustion engine 10.

The control section 80 includes memories 80A, each functioning as storage means (storage unit) that stores and holds an arithmetic unit, various control programs, arithmetic maps, and data and the like calculated when executing control. As power is supplied from the battery 33, a part of the memory 80A functions as backup memory that holds stored information even while the engine stops. The control section 80 monitors the operating state of the internal combustion engine 10 based on detection results of the above-described respective sensors, and executes various kinds of control including fuel injection control that adjusts a fuel injection amount and a fuel injection timing of the fuel injection valve 13, ignition timing control that adjusts an ignition timing of the ignition plug 14, and valve timing variable control that controls a valve timing of the intake valve 21, based on the operating state.

Figure 2:
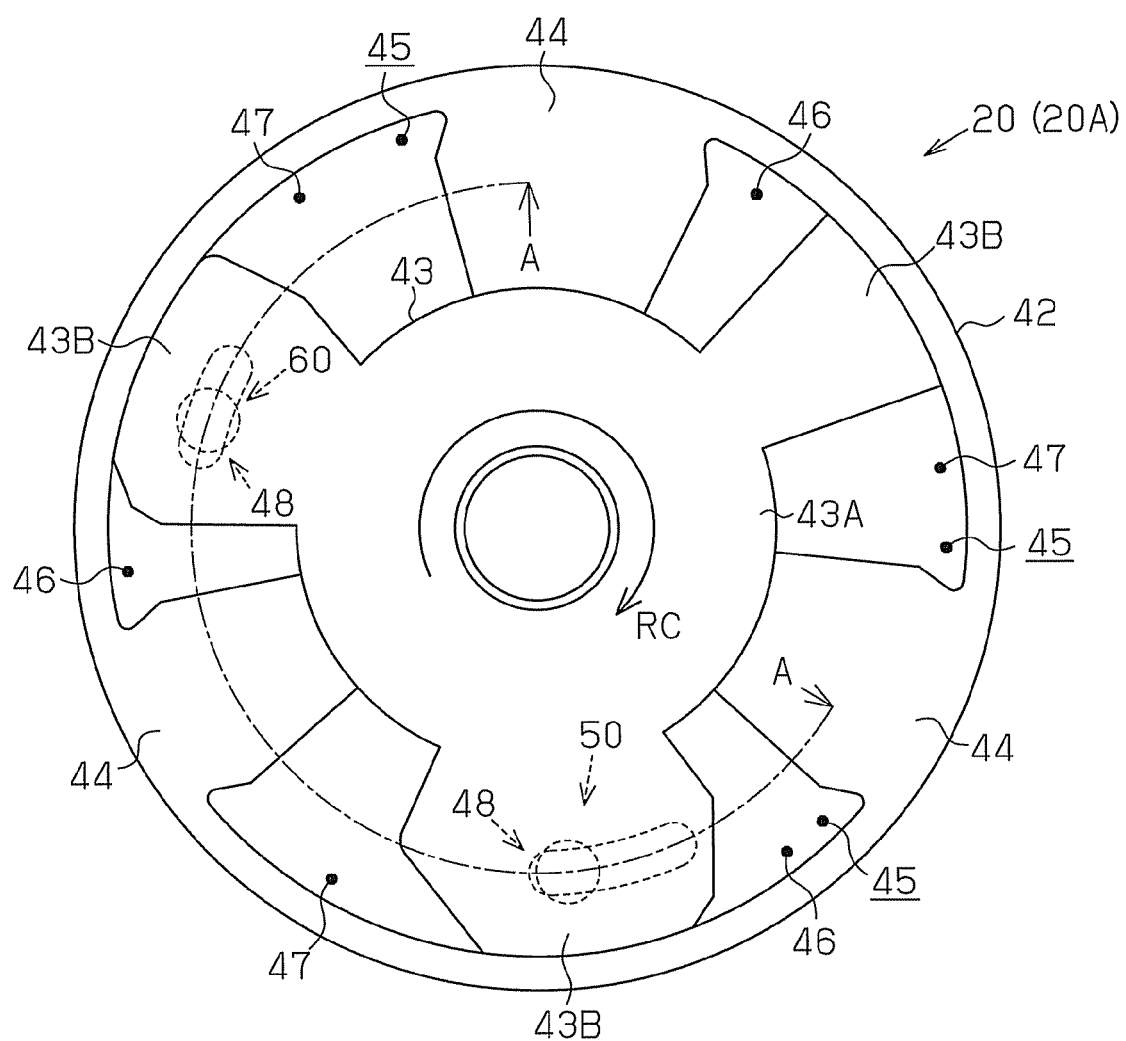
FIG. 2 is an end view showing the internal structure of a variable valve device according to this embodiment, from which a sprocket has been removed.

Next, the configuration of the variable valve device 20 will be described with reference to FIG. 2. FIG. 2 shows the internal structure of the variable valve device 20 from which the sprocket 41 is removed. The variable valve device 20 includes a variable mechanism 20A that changes the valve timing of the intake valve 21, and a lock mechanism 48 that mechanically locks the valve timing of the intake valve 21 at an intermediate timing between a most advanced timing PH and a most retarded timing PL (hereinafter referred to as a specific timing PM). The specific timing PM is set at the valve timing capable of starting the engine and, more particularly, capable of starting the engine in cold start conditions. Incidentally, the lock mechanism 48 corresponds to a fixation mechanism, which can fix the valve timing at the specific timing PM.

The above-described sprocket 41, a housing 42, and the cover 40 are fixed by bolts (not shown), and integrally rotated around the axis of rotation of the camshaft 22. The cover 40, the sprocket 41, and the housing 42 function as a second rotating body, which is drivingly connected to the crankshaft 17. Incidentally, it is supposed that the camshaft 22 and the housing 42 rotate in a rotational direction RC as shown in FIG. 2.

The housing 42 is provided with three partitions 44, which extend inward in its radial direction. Further, a vane rotor 43, which rotates around the same axis of rotation as the housing 42 is rotationally received in the housing 42. The vane rotor 43 has a boss 43A, which is connected to the camshaft 22 to be able to rotate integrally, and three vanes 43B, which project outward in a radial direction of the boss 43A. Housing chambers 45 are defined by the respective partitions 44 of the housing 42 and the boss 43A of the vane rotor 43, and each housing chamber 45 is divided by each vane 43B into an advancement chamber 46 and a retardation chamber 47. Incidentally, the vane rotor 43 functions as a first rotating body, which is drivingly connected to the camshaft 22.

The lock mechanism 48 includes an advancement lock mechanism 50 and a retardation lock mechanism 60 respectively provided in different vanes 43B. The advancement lock mechanism 50 has the function of limiting relative rotation between the housing 42 and the vane rotor 43 toward the direction in which the valve timing changes to be more advanced than the specific timing PM. Meanwhile, the retardation lock mechanism 60 has the function of limiting the relative rotation between the housing 42 and the vane rotor 43 toward the direction in which the valve timing changes to be more retarded than the specific timing PM. Further, the advancement lock mechanism 50 and the retardation lock mechanism 60 also have a ratchet function that allows the valve timing to discretely advance from the more retarded side than the specific timing PM to the specific timing PM. The advancement lock mechanism 50 and the retardation lock mechanism 60 operate together to lock the valve timing at the specific timing PM.

Figure 3:
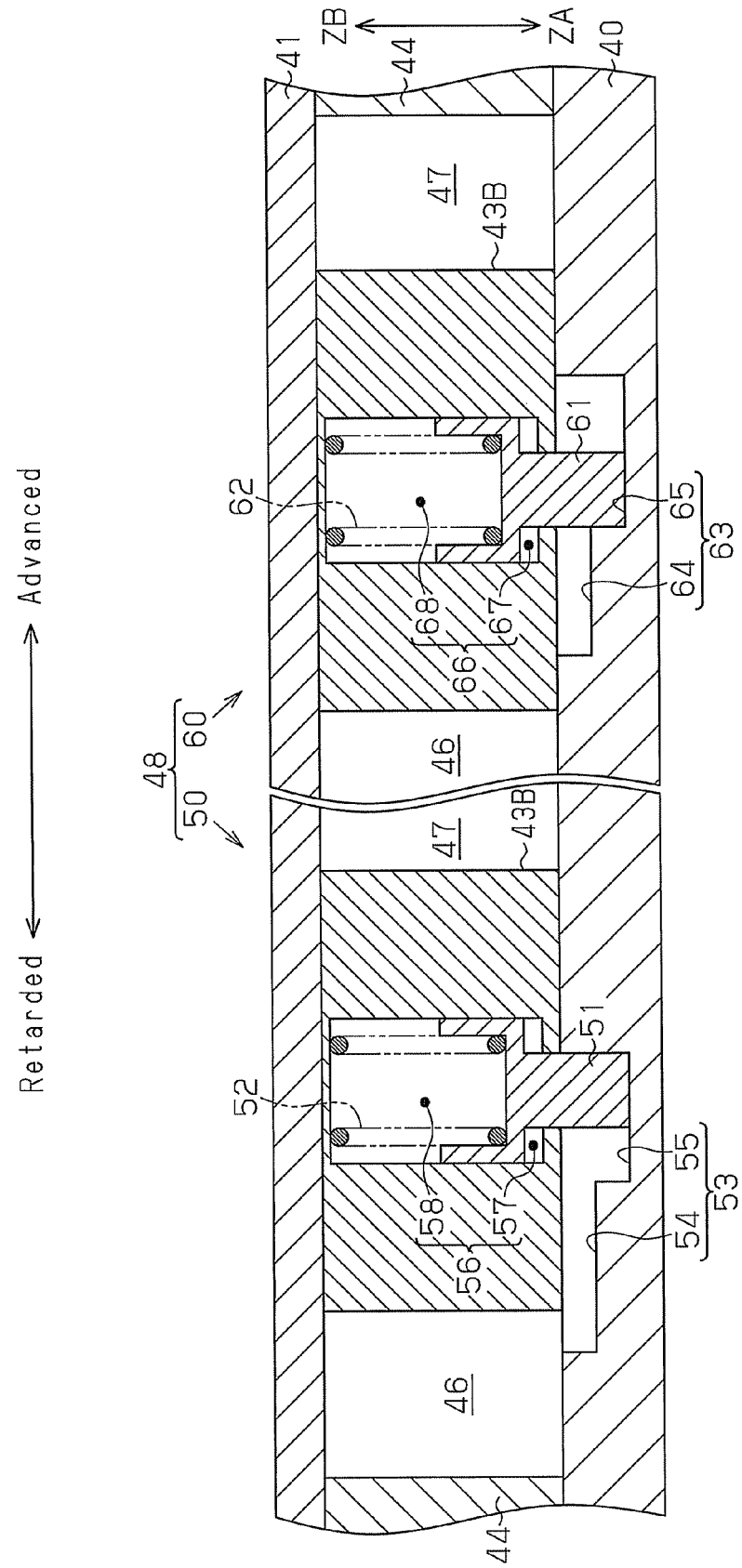
FIG. 3 is a cross-sectional view showing the cross-sectional structure taken along line A-A in FIG. 2.
Figure 4A:
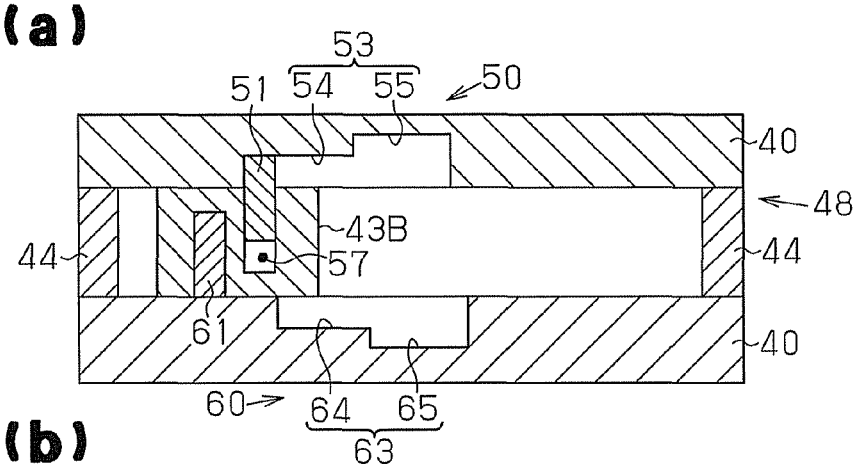
FIGS. 4(a) to 4(d) are cross-sectional views schematically showing the cross-sectional structure taken along line A-A in FIG. 2, and showing an advancement process of a valve timing from the most retarded timing to a specific timing in order, at an engine start-up time.
Figure 4B:
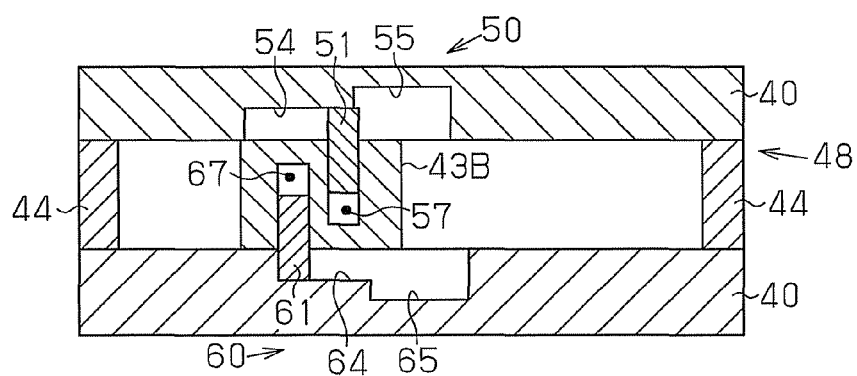
Figure 4C:
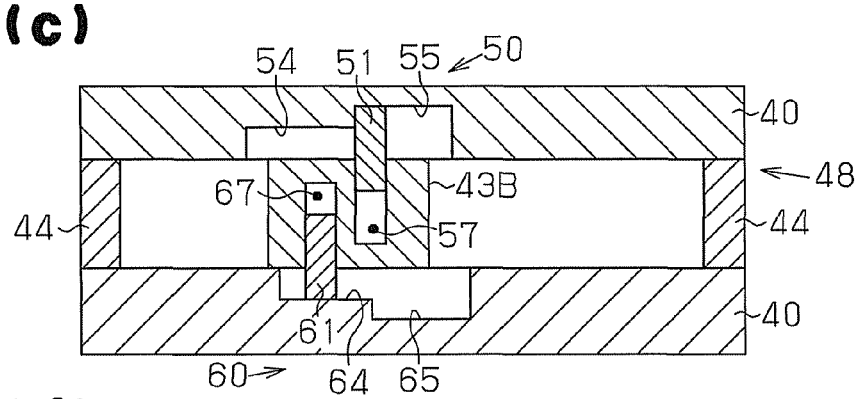
Figure 4D:
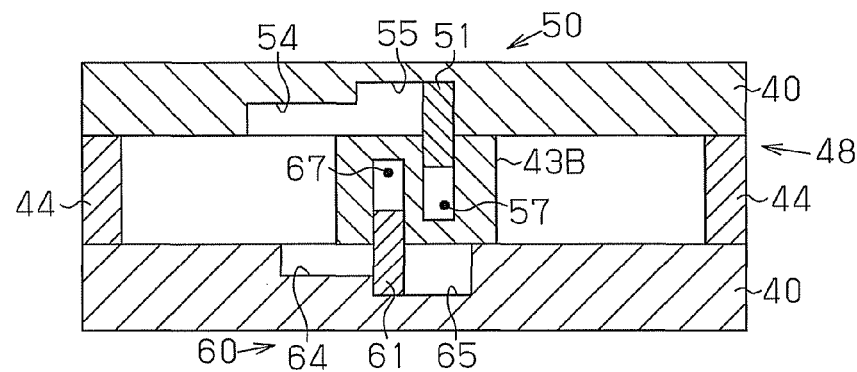

Next, the detailed structure of the lock mechanism 48 will be described with reference to FIG. 3. In the following description, the side where the cover 40 of the variable valve device 20 is attached, along the axis of the camshaft 22, is referred to as a frontal side ZA, and the side where the sprocket 41 is attached is referred to as a basal side ZB.

The advancement lock mechanism 50 includes a first lock pin 51, which has a cylindrical shape and is provided in the vane 43B, and a first recess 53, into or from which the first lock pin 51 is fitted or pulled out. The first recess 53 is formed in the cover 40.

The first lock pin 51 reciprocates in a vane hole 56 formed in the vane 43B between the frontal side ZA and the basal side ZB, and projects outside the vane 43B to be fitted into the first recess 53. The vane hole 56 is divided by the first lock pin 51 into a first spring chamber 58 on the basal side ZB and a first release chamber 57 on the frontal side ZA. A first spring 52, which urges the first lock pin 51 toward the frontal side ZA, is received in the first spring chamber 58. Meanwhile, the hydraulic oil is supplied to the first release chamber 57 via the above-described hydraulic oil passage 26 (refer to FIG. 1). The first lock pin 51 is urged toward the basal side ZB by force based on a pressure of the supplied hydraulic oil.

The first recess 53 has an arcuate shape in a circumferential direction of the cover 40. Specifically, the first recess 53 is formed by a first upper-step 54 having a relatively smaller depth, and a first lower-step 55 having a relatively greater depth. The first upper-step 54 is formed at the more retarded side than the first lower-step 55.

The retardation lock mechanism 60 includes a second lock pin 61, which has a cylindrical shape and is provided in the vane 43B, and a second recess 63, into which the second lock pin 61 is fitted. The second recess 63 is formed in the cover 40.

The second lock pin 61 reciprocates in a vane hole 66 formed in the vane 43B between the frontal side ZA and the basal side ZB, and projects outside the vane 43B to be fitted into the second recess 63. The vane hole 66 is divided by the second lock pin 61 into a second spring chamber 68 on the basal side ZB and a second release chamber 67 on the frontal side ZA. A second spring 62, which urges the second lock pin 61 toward the frontal side ZA, is received in the second spring chamber 68. Meanwhile, the hydraulic oil is supplied to the second release chamber 67 via the above-described hydraulic oil passage 26 (refer to FIG. 1). The second lock pin 61 is urged toward the basal side ZB by the force based on the pressure of the supplied hydraulic oil.

The second recess 63 has an arcuate shape in the circumferential direction of the cover 40. Specifically, the second recess 63 is formed by a second upper-step 64 having a relatively smaller depth, and a second lower-step 65 having a relatively greater depth. The second upper-step 64 is formed at the more retarded side than the second lower-step 65.

The first lock pin 51, the second lock pin 61, the first upper-step 54 and the first lower-step 55 formed in the first recess 53, and the second upper-step 64 and the second lower-step 65 formed in the second recess 63 function as a ratchet mechanism that allows the valve timing to discretely advance to the specific timing PM by alternating torque acting on the camshaft 22. Namely, the first upper-step 54 and the first lower-step 55 formed in the first recess 53 limit displacement of the first lock pin 51 toward the retarded side, when the first lock pin 51 fits into the steps 54 and 55. Meanwhile, the second upper-step 64 and the second lower-step 65 formed in the second recess 63 limit the displacement of the second lock pin 61 toward the retarded side, when the second lock pin 61 fits therein. When the first lock pin 51 fits into the first lower-step 55, and the second lock pin 61 fits into the second lower-step 65, the displacement of the first lock pin 51 toward the advanced side is limited by the edge on the advanced side of the first lower-step 55. Also, the displacement of the second lock pin 61 toward the retarded side is limited by the edge on the retarded side of the second lower-step 65. Thus, the valve timing is locked at the specific timing PM. Incidentally, FIG. 3 shows the state where the lock mechanism 48 is locked and the valve timing is locked at the specific timing PM.

Next, operation of the variable valve device 20 will be described.

When the crankshaft 17 rotates with the operation of the engine, its driving force is transmitted to the variable valve device 20 via the timing chain (illustration omitted), and the camshaft 22 rotates together with the variable valve device 20. Thereby, the intake valve 21 is opened and closed by a cam (illustration omitted) provided to the camshaft 22.

Further, when supply or drainage of the hydraulic oil to or from the advancement chamber 46 and the retardation chamber 47 of the variable valve device 20 is controlled via the oil control valve 25, the vane 43B is displaced in the housing chamber 45 based on the hydraulic pressure of the advancement chamber 46 and the retardation chamber 47. Thereby, a relative rotational position of the vane rotor 43 relative to the sprocket 41 and the housing 42, that is, a relative rotational position of the camshaft 22 relative to the crankshaft 17 is changed, so that the valve timing of the intake valve 21 is changed.

Specifically, when the hydraulic oil is supplied to the advancement chamber 46 of the variable valve device 20 and the hydraulic oil is drained from the retardation chamber 47, the vane rotor 43 is rotated relative to the housing 42 toward the advanced side, so that the valve timing is advanced. When the vane 43B abuts against an inner wall on the advanced side of the retardation chamber 47, the valve timing becomes the most advanced timing PH. Further, when the hydraulic oil is supplied to the retardation chamber 47 and the hydraulic oil is drained from the advancement chamber 46, the relative rotation of the vane rotor 43 relative to the housing 42 is made toward the retarded side, so that the valve timing is retarded. When the vane 43B abuts against the inner wall on the retarded side of the advancement chamber 46, the valve timing becomes the most retarded timing PL.

When an engine stop request is made, the hydraulic pressure of the advancement chamber 46 and the retardation chamber 47 is controlled via the oil control valve 25 so that the valve timing becomes the specific timing PM. When the hydraulic oil is drained from the first release chamber 57 of the advancement lock mechanism 50, and the hydraulic pressure of the first release chamber 57 becomes lower than a release oil pressure, the first lock pin 51, which is urged by the first spring 52, fits into the first recess 53 (first lower-step 55). Similarly, when the hydraulic oil is drained from the second release chamber 67 of the retardation lock mechanism 60, and the hydraulic pressure of the second release chamber 67 becomes lower than the release oil pressure, the second lock pin 61, which is urged by the second spring 62, fits into the second recess 63 (second lower-step 65). Thus, the displacement of the first lock pin 51 toward the advanced side is limited by the edge on the advanced side of the first lower-step 55, and the displacement of the second lock pin 61 toward the retarded side is limited by the edge on the retarded side of the second lower-step 65, so that the valve timing is locked at the specific timing PM. In the following description, the stop of the engine while the valve timing is locked at the specific timing PM, as described above, is referred to as engine normal stop.

When the start request of the internal combustion engine 10 is made after the above-described engine normal stop, the cranking is started while the valve timing is at the specific timing PM. Since the specific timing PM is set at the valve timing capable of starting the engine, as described above, the internal combustion engine 10 can be started in a favorable manner.

When predetermined conditions are satisfied after the engine is started, the first lock pin 51 and the second lock pin 61 are pulled out from the first recess 53 and the second recess 63, respectively. Specifically, when hydraulic oil is supplied to the first release chamber 57 of the advancement lock mechanism 50, and the hydraulic pressure of the first release chamber 57 increases to be higher than the release oil pressure, the first lock pin 51 moves toward the basal side ZB by urging force based on the hydraulic pressure, and is pulled out from the first recess 53. Further, when the hydraulic oil is also supplied to the second release chamber 67 of the retardation lock mechanism 60, and the hydraulic pressure of the second release chamber 67 increases to be higher than the release oil pressure, the second lock pin 61 moves toward the basal side ZB by the urging force based on the hydraulic pressure and is pulled out from the second recess 63. Thereby, the relative rotation between the housing 42 and the vane rotor 43 is permitted. Thereafter, the oil control valve 25 is controlled such that the valve timing becomes a desired timing suited for the engine operating state.

Meanwhile, in the case where the valve timing is not locked at the specific timing PM when the engine stop request is made (hereinafter referred to as "engine abnormal stop"), the operation of the internal combustion engine 10 is stopped while the valve timing is at the most retarded timing PL or the like that is different from the specific timing PM.

When the start request of the internal combustion engine 10 is made after the engine abnormal stop, the cranking is started while the valve timing is not at the specific timing PM. This may cause deterioration of engine startability, including the cases where the engine start-up is impossible, a longer period of time is required for the engine start-up, and the like. Incidentally, at the time of the engine abnormal stop like this, it is likely that the valve timing changes to the most retarded timing PL. This is because the relative rotation between the vane rotor 43 and the sprocket 41 is made toward the direction of retarding the valve timing, with a reduction in the hydraulic pressure of the advancement chamber 46 and the retardation chamber 47 until the stop of the internal combustion engine 10 is completed.

Therefore, according to this embodiment, the steps 54, 55, 64 and 65 are formed in the first recess 53 and the second recess 63 of the lock mechanism 48, and the valve timing is advanced from the most retarded timing PL to the specific timing PM by using the alternating torque acting on the camshaft 22 during the cranking, in order to improve the engine startability after the engine abnormal stop.

Figure 5:
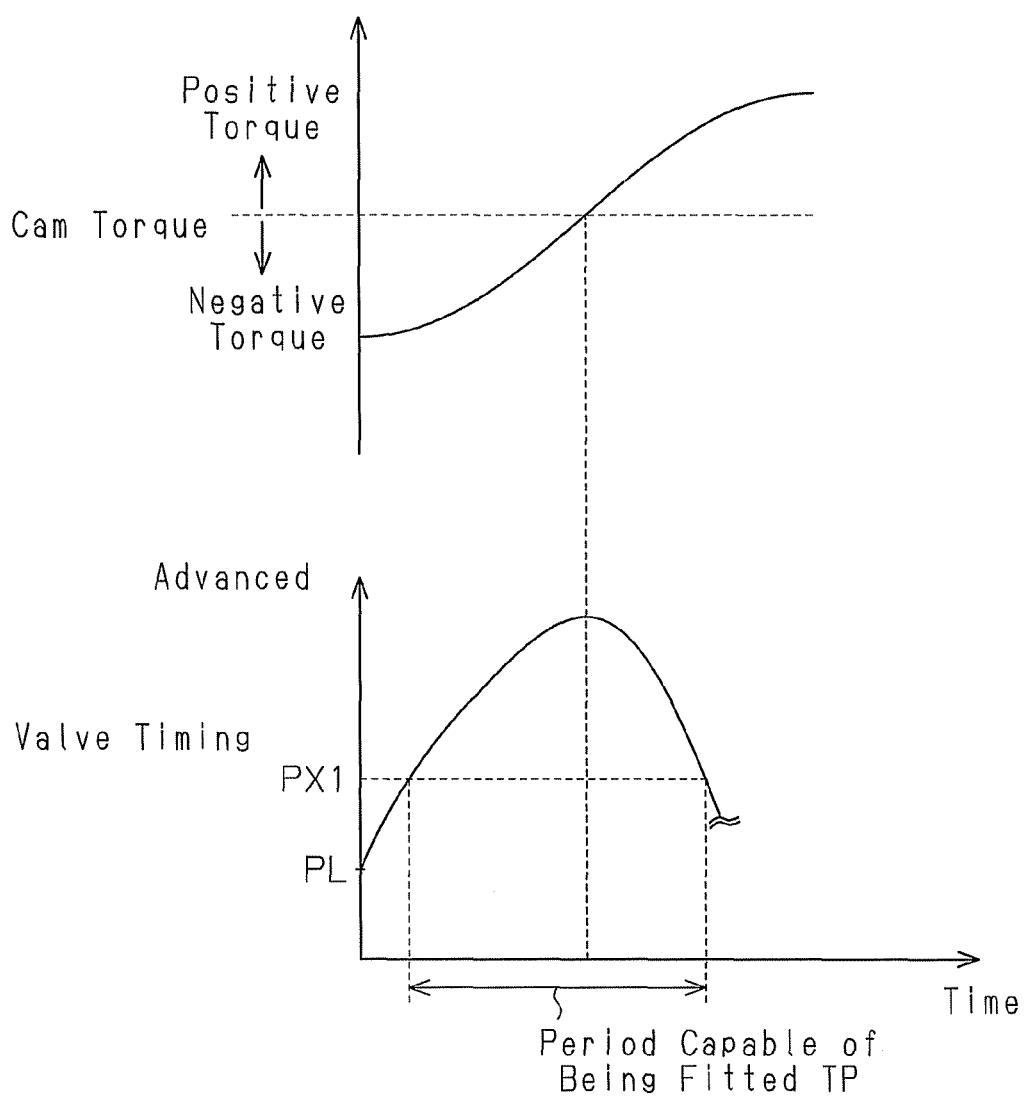
FIG. 5 is an explanatory diagram showing the relationship between alternating torque acting on the camshaft during cranking and change modes of the valve timing.

Next, a description will be given of the process of advancement of the valve timing from the most retarded timing PL to the specific timing PM at the engine start-up time, with reference to FIGS. 4 and 5. FIGS. 4(*a*) to 4(*d*) show the advancement process of the valve timing from the most retarded timing PL to the specific timing PM in order. Incidentally, FIGS. 4(*a*) to 4(*d*) show the first lock pin 51 and the second lock pin 61 as if they project from the same vane 43B in opposite directions, and the first recess 53 and the second recess 63 as if they faced each other along the axis, in order to facilitate understanding of the relationship between the operating state of the advancement lock mechanism 50 and the operating state of the retardation lock mechanism 60.

When the cranking is started while the valve timing is not at the specific timing PM, the relative rotation between the vane rotor 43 and the housing 42 is made by the alternating torque acting on the camshaft 22, with its relative rotational direction being reversed periodically, so that the valve timing is changed to the retarded side and to the advanced side. Specifically, as shown in FIG. 5, negative torque operating in the direction advancing the valve timing, and positive torque operating in the direction retarding the valve timing act on the camshaft 22 alternately. Thereby, the state where the lock pins 51 and 61 are at the positions capable of being fitted in the steps 54, 55, 64 and 65 of the recesses 53 and 63, and the state where the lock pins 51 and 61 are at the positions incapable of being fitted therein are repeated.

When, for example, the alternating torque acts on the camshaft 22 while the valve timing is at the most retarded timing PL, at the start of the cranking, the negative torque operates to rotate the vane rotor 43 relative to the housing 42 toward the advanced side. Thereby, the first lock pin 51 and the second lock pin 61 are displaced toward the advanced side, and the valve timing is advanced greatly by exceeding a first retardation timing PX1 (refer to FIG. 5). Next, the positive torque operates to rotate the vane rotor 43 relative to the housing 42 toward the retarded side. Thereby, the first lock pin 51 and the second lock pin 61 are displaced toward the retarded side. During any of the periods while the lock pins 51 and 61 are displaced, the first lock pin 51 projects toward the first upper-step 54 (FIG. 4(*a*)), when the first lock pin 51 is at the position capable of being fitted in the first upper-step 54, that is, when the first lock pin 51 is on the basal side ZB of the first upper-step 54 (a "period capable of being fitted TP" shown in FIG. 5). In this state, the first lock pin 51 is brought into contact with the edge on the retarded side of the first upper-step 54, so that the relative rotation between the housing 42 and the vane rotor 43 toward the direction retarding the valve timing is limited. Thus, the retardation of the valve timing is limited at the first retardation timing PX1 that is at the more advanced side than the most retarded timing PL.

Based on the alternating torque further acting on the camshaft 22 in this state, the second lock pin 61 is fitted into the second upper-step 64 (FIG. 4(*b*)), the first lock pin 51 is fitted into the first lower-step 55 (FIG. 4(*c*)), and the second lock pin 61 is fitted into the second lower-step 65 (FIG. 4(*d*)). Thereby, the retardation of the valve timing is limited in the order of a second retardation timing PX2, a third retardation timing PX3, and the specific timing PM, and a shift is made to the state where the valve timing is locked at the specific timing PM.

Incidentally, at the time of a cold start of the internal combustion engine 10, the temperature of the hydraulic oil (oil temperature) TOIL is low and its viscosity is high, so that resisting force of the hydraulic oil that is generated at the time of the relative rotation between the vane rotor 43 and the housing 42 by the alternating torque acting on the camshaft 22 is increased. This reduces the amount of the relative rotation between the vane rotor 43 and the housing 42, which is made when the alternating torque acts on the camshaft 22, which makes it difficult to change the valve timing to the specific timing PM and lock the valve timing at the specific timing PM during execution of the cranking.

Further, at the time of a cold start, vaporization of injected fuel is not facilitated and combustion of the injected fuel is difficult, so that a period from when the cranking is started until when the internal combustion engine 10 shifts to a complete combustion state is increased. Therefore, at the time of a cold start and when the valve timing is not at the specific timing PM at the start of the cranking, the deterioration of the engine startability becomes even more severe.

Figure 6:
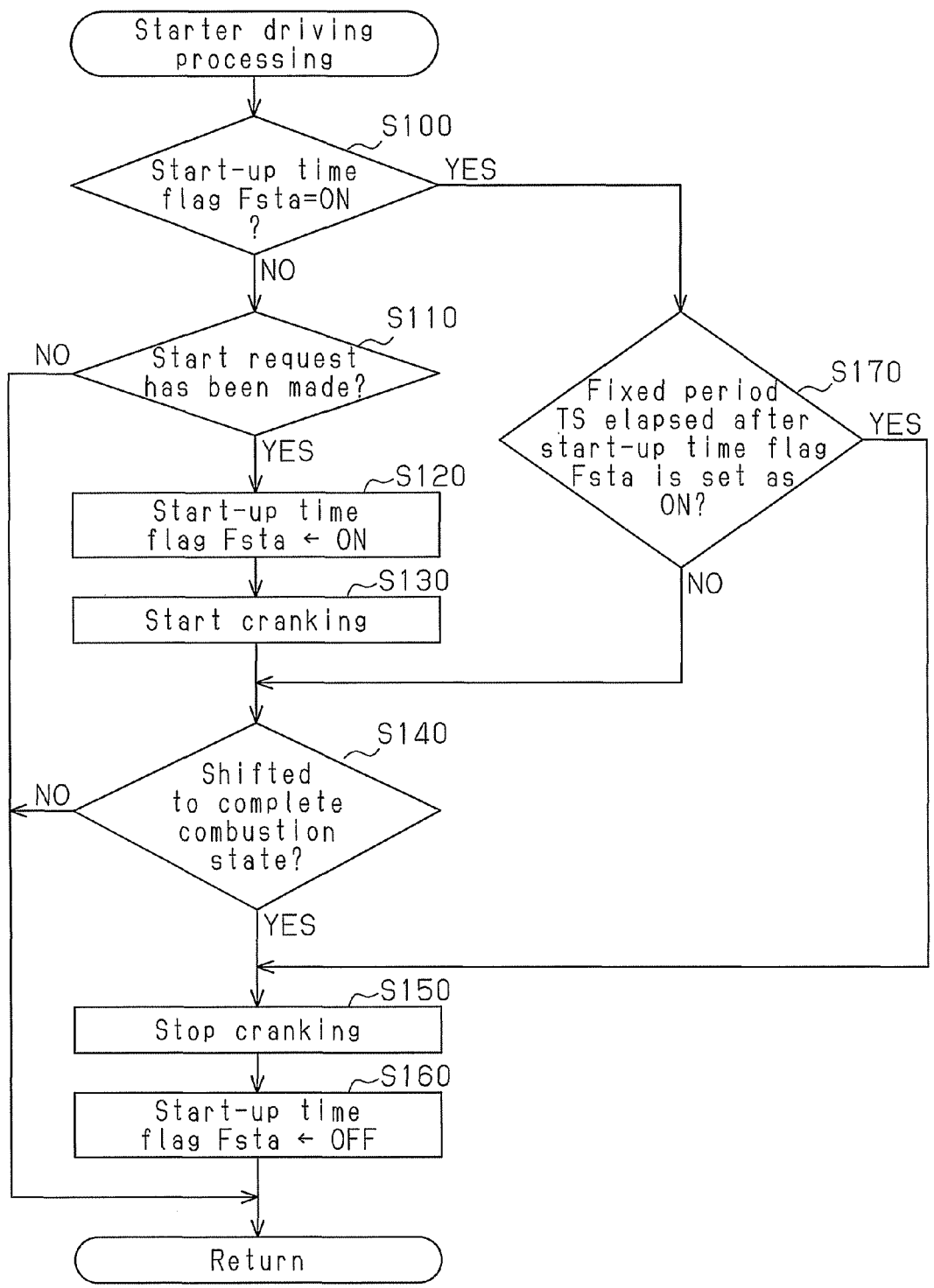
FIG. 6 is a flowchart showing processing procedures of starter driving processing according to this embodiment.
Figure 7:
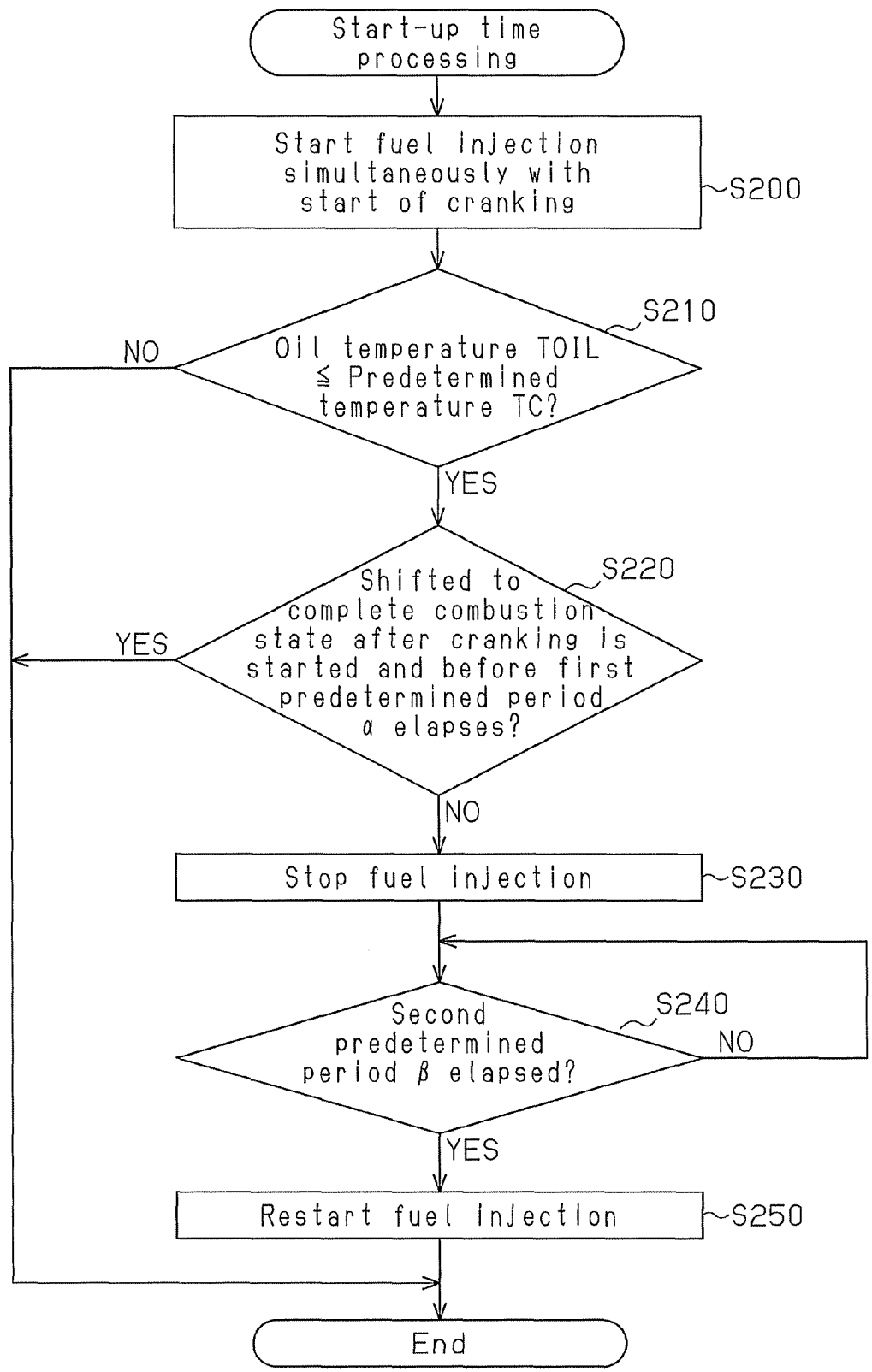
FIG. 7 is a flowchart showing processing procedures of start-up time processing according to this embodiment.

Therefore, this embodiment executes start-up time processing shown in FIG. 7 together with starter driving processing shown in FIG. 6, so as to deal with the above-described deterioration of the engine startability.

Next, a description will be given of processing procedures of the starter driving processing, which is executed at the start-up of the internal combustion engine 10, with reference to FIG. 6. After the start-up of the internal combustion engine 10, a series of processes shown in the drawing is executed repeatedly by the control section 80 at predetermined intervals.

When the processing is started, it is first determined whether a start-up time flag Fsta is ON or not (step S100). Specifically, it is determined by referring to start-up time flag Fsta information stored in the memory 80A. The initial value of the start-up time flag Fsta is set as OFF.

When it is determined that the start-up time flag Fsta is OFF (step S100: NO), it is then determined whether the start request is made or not (step S110). Specifically, it is determined that the start request is made when the start signal STSW is transmitted from the engine switch 81. When it is determined that the start request is not made (step S110: NO), the processing is ended.

Meanwhile, when it is determined that the start request is made (step S110: YES), the start-up time flag Fsta is set as ON (step S120), and the cranking is started (step S130). Specifically, an actuating signal STAR is transmitted from the control section 80 to a starter relay (illustration omitted) and the starter 32 is driven, so as to start the cranking. At this time, a cranking speed R is set at a rotation speed RA.

Next, it is determined whether the internal combustion engine 10 has shifted to the complete combustion state or not (step S140). Specifically, when the engine rotation speed NE detected by the crank angle sensor 82 reaches a complete combustion rotation speed NS (NE≥NS), it is determined that the shift to the complete combustion state has been made. Incidentally, the "complete combustion" means that the crankshaft 17 of the internal combustion engine 10 reaches the state of being able to rotate autonomously. Further, the complete combustion rotation speed NS is a value of the engine rotation speed NE that is set in advance, with which the crankshaft 17 can be determined as having reached the state of being able to rotate autonomously (400 rpm, for example).

When the engine rotation speed NE reaches the complete combustion rotation speed NS (NE≥NS), and when it is determined that the internal combustion engine 10 has shifted to the complete combustion state (step S140: YES), the cranking is stopped (step S150). Specifically, the actuating signal STAR from the control section 80 is stopped to stop the starter 32. Then, the start-up time flag Fsta is set as OFF (step S160), and this processing is ended.

Meanwhile, when it is determined that the engine rotation speed NE has not reached the complete combustion rotation speed NS (NE<NS) and that the internal combustion engine 10 has not shifted to the complete combustion state, in the determination process of the above-described step S140 (step S140: NO), this processing is ended temporarily and the processes from step S100 are executed again.

When the processes from step S100 are executed again, the processing moves to step S170 as the start-up time flag Fsta is set as ON (step S100: YES), and it is determined whether a fixed period TS has elapsed or not after the start-up time flag Fsta is set as ON (step S170). A period longer than the sum of a later-described first predetermined period α and a second predetermined period β is set as the fixed period TS. Specifically, the fixed period TS is a period sufficiently long as the period during which the cranking is desirably continued for a single manipulation of the engine switch 81 by the driver when the internal combustion engine 10 does not shift to the complete combustion state (25 seconds, for example).

When it is determined that the fixed period TS has not elapsed after the start-up time flag Fsta is set as ON (step S170: NO), the processes after step S140 are executed again. When it is determined that the fixed period TS has elapsed after the start-up time flag Fsta is set as ON (step S170: YES), the cranking is stopped (step S150), the start-up time flag Fsta is set as OFF (step S160), and this processing is ended.

When either one of the following conditions (a) and (b) is satisfied by the series of processes, the cranking is stopped.

(a) The internal combustion engine 10 has shifted to the complete combustion state after the cranking is started and before the fixed period TS elapses.

(b) The internal combustion engine 10 has not shifted to the complete combustion state even though the cranking is continued for the fixed period TS.

Next, a description will be given of processing procedures of the start-up time processing, which is executed by the control section 80 after the start-up of the internal combustion engine 10, with reference to FIG. 7. Incidentally, the start-up time processing shown in the drawing is started once each time the driver operates the engine switch 81.

First, the fuel injection is started simultaneously with the start of the cranking (step S200) in this processing. Namely, the fuel injection from the fuel injection valve 13 is started at the same time when the cranking is started in the above-described step S130. At this time, a fuel injection amount QF is set at the amount suitable for the engine start-up time after the engine normal stop (normal injection amount QA). Incidentally, asynchronous injection that is not in synchronization with the crank angle CA is executed immediately after the start-up of the internal combustion engine 10 and while cylinder determination of the internal combustion engine 10, based on the signals from the crank angle sensor 82 and the cam angle sensor 83, is not completed.

Next, it is determined whether the oil temperature TOIL is equal to or lower than a predetermined temperature TC (TOIL≤TC) or not (step S210). The oil temperature TOIL is obtained based on the detection result of the water temperature sensor 84. Due to such a relationship that the lower the engine cooling water temperature TW is, the lower the hydraulic oil temperature TOIL becomes, the oil temperature TOIL can be obtained based on the engine cooling water temperature TW. The above-described predetermined temperature TC is set in advance in consideration of efficiency of the advancement of the valve timing by the ratchet mechanism (−25° C., for example).

When it is determined that the oil temperature TOIL is higher than the predetermined temperature TC (TOIL>TC) (step S210: NO), it is possible to determine that, even when the valve timing is not at the specific timing PM at the start of the cranking, it is highly probable that the engine start-up can be completed. This is because the determination can be made that the temperature of the internal combustion engine 10 is relatively high, and the injected fuel is vaporized in a relatively favorable manner and is likely to be combusted in the combustion chamber 12. This is also because the determination can be made that, when the oil temperature TOIL is relatively high and the viscosity of the hydraulic oil is low, it is relatively highly probable that the valve timing can be shifted to the specific timing PM promptly by the ratchet mechanism by using the alternating torque acting on the camshaft 22 during the cranking. Therefore, when it is determined in the determination process of the above-described step S210 that the oil temperature TOIL is higher than the predetermined temperature TC (TOIL>TC) (step S210: NO), this processing is ended.

Meanwhile, when it is determined that the oil temperature TOIL is equal to or lower than the predetermined temperature TC (TOIL≤TC) (step S210: YES), it is then determined whether the internal combustion engine 10 has shifted to the complete combustion state or not after the cranking is started and before the first predetermined period α elapses (step S220). As shown in FIG. 6 above, when the internal combustion engine 10 shifts to the complete combustion state, the starter 32 is stopped to stop the cranking (step S150). Further, while the starter 32 is driven, a starter signal STA is transmitted from the starter 32 to the control section 80. Therefore, in the determination process of step S220, it is determined as positive when the starter signal STA from the starter 32 is stopped after the cranking is started and before the first predetermined period α elapses (step S220: YES). According to the process of step S220, it is determined whether a start-up failure of the internal combustion engine 10 is caused or not. Incidentally, the above-described first predetermined period α is the period that is set in advance, with which it can be determined that the valve timing is highly probably not at the specific timing PM at the start of the cranking (five seconds, for example).

When it is determined as positive in the determination process of step S220, that is, when it is determined that the internal combustion engine 10 has shifted to the complete combustion state after the cranking is started and before the first predetermined period α elapses (step S220: YES), the determination can be made that the engine start-up has been completed in a favorable manner. Thereby, this processing is ended. After that, the various kinds of control are executed according to the operating state of the internal combustion engine 10.

Meanwhile, when it is determined as negative in the determination process of step S220 (step S220: NO), the fuel injection is stopped (step S230). Namely, when the starter signal STA, which shows that the starter 32 is being driven, is transmitted from the starter 32, even when the first predetermined period α has elapsed after the cranking is started, it is possible to determine that a start-up failure has been caused. When a start-up failure like this is caused, the determination can be made that the valve timing may not be at the specific timing PM at the start of the cranking. Therefore, in this case, the fuel injection is stopped as start-up failure processing that addresses the state where the valve timing is at the timing different from the specific timing PM (step S230).

Next, it is determined whether the second predetermined period β has elapsed or not after the fuel injection is stopped (step S240). The second predetermined period β is a period that is set in advance with which the valve timing is advanced further in a preferable manner via the ratchet mechanism while avoiding adhesion of unburned fuel to the ignition plug 14 when the advancement of the valve timing is not made to the specific timing PM in the above-described first predetermined period α (three seconds, for example). Namely, when the valve timing is different from the specific timing PM, and when it takes a long period of time before the engine start-up is completed, misfiring occurs frequently due to the unburned fuel adhered to the ignition plug 14, thus promoting further deterioration of the engine startability. Therefore, this embodiment provides the period during which the fuel injection is stopped temporarily (second predetermined period β) to avoid the adhesion of the unburned fuel to the ignition plug 14 and to allow the valve timing to advance to the specific timing PM.

When it is determined that the second predetermined period β has not elapsed after the fuel injection is stopped (step S240: NO), the determination process of step S240 is executed repeatedly at predetermined time intervals until it is determined as positive.

When it is determined from such a determination process that the second predetermined period β has elapsed after the fuel injection is stopped (step S240: YES), the fuel injection is restarted (step S250). Namely, the fuel injection amount QF is changed from zero back to the normal injection amount QA, and this processing is ended.

Figure 8:
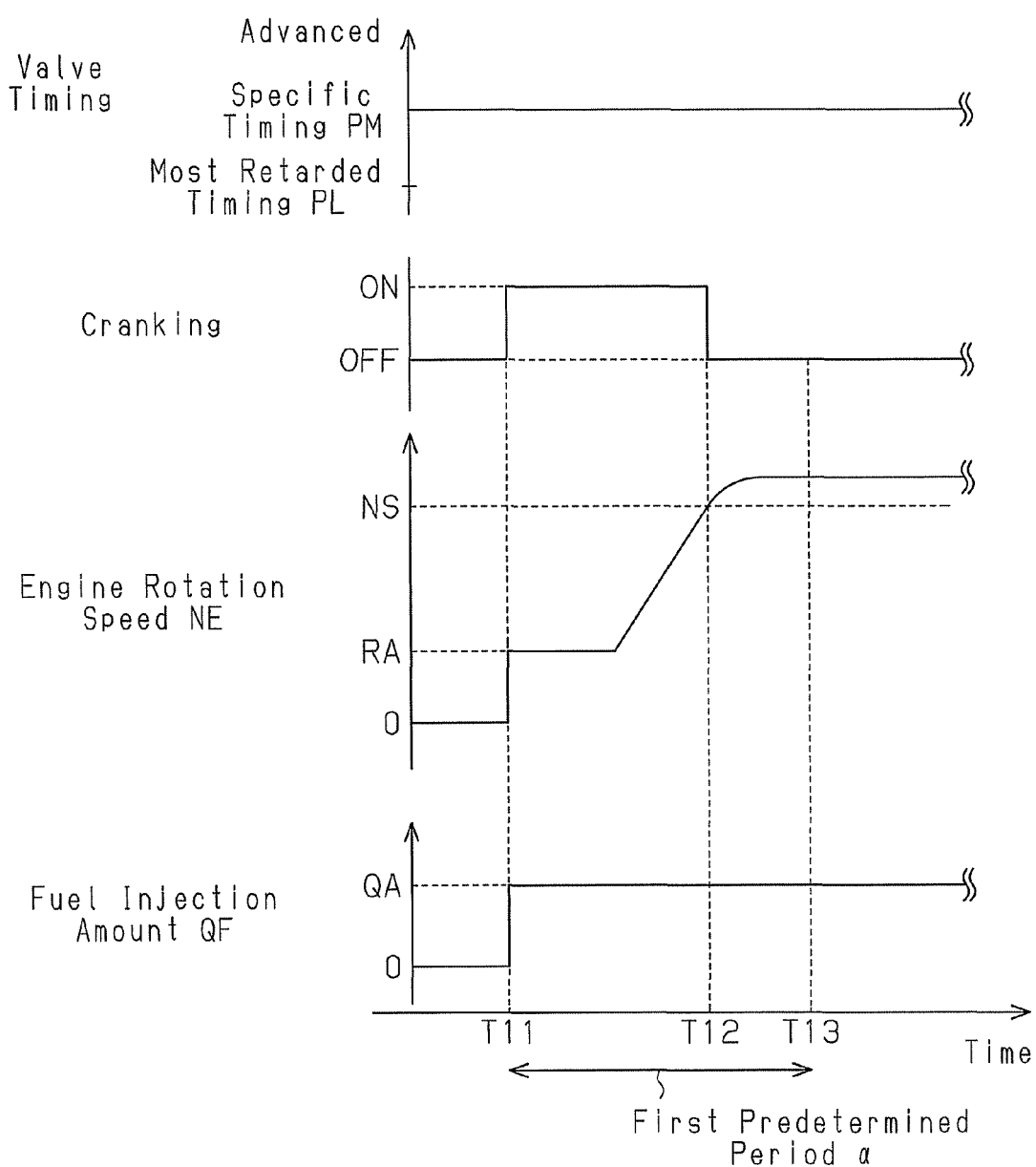
FIG. 8 is a timing chart showing change modes of the valve timing, the cranking, an engine rotation speed and a fuel injection amount at the engine start-up time after engine normal stop.
Figure 9:
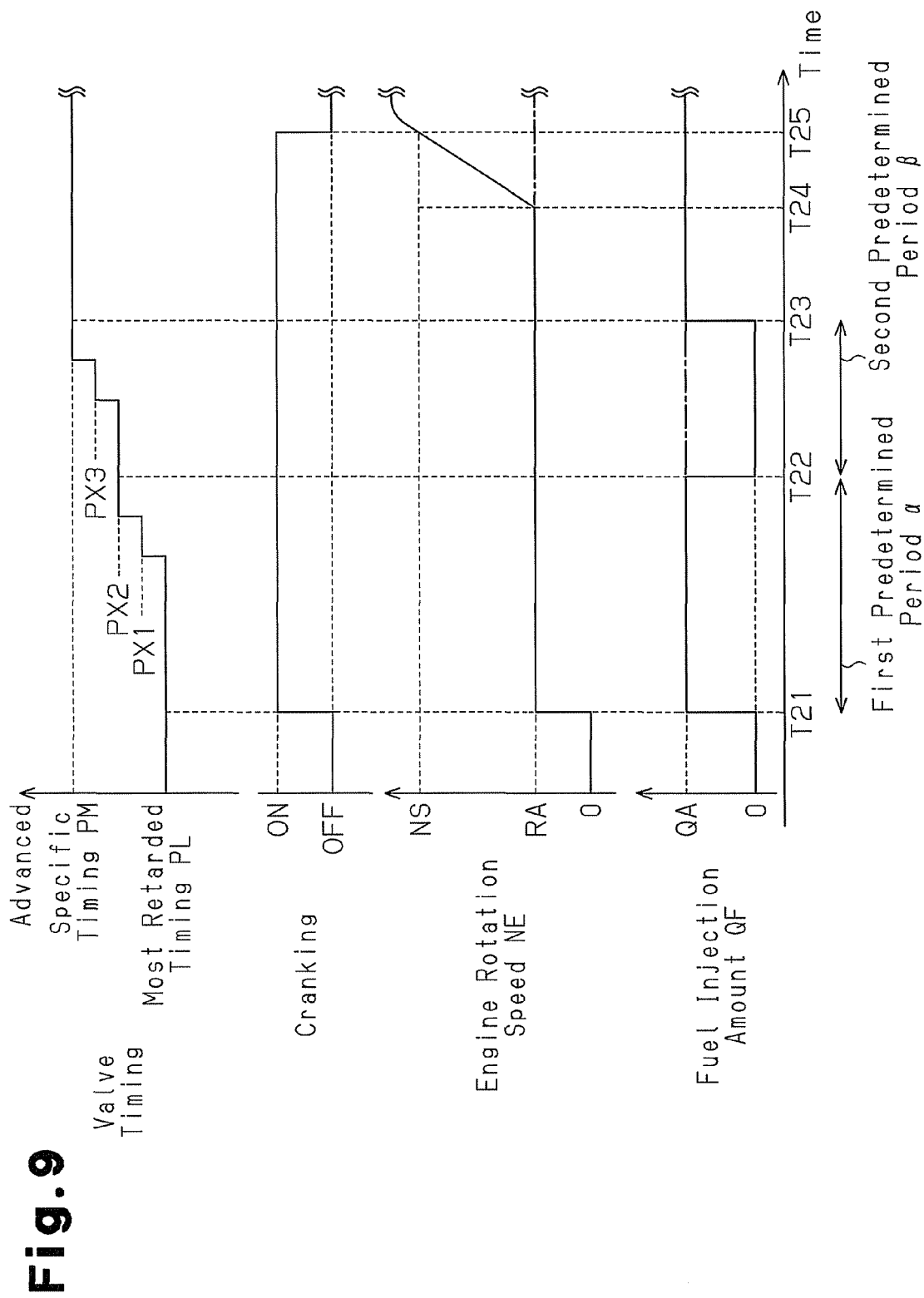
FIG. 9 is a timing chart showing change modes of the valve timing, the cranking, the engine rotation speed and the fuel injection amount at the engine start-up time after engine abnormal stop.

Next, a description will be given of change modes of the valve timing, the cranking, the engine rotation speed NE, and the fuel injection amount QF at the engine start-up time, when the above-described starter driving processing and the start-up time processing are executed, with reference to FIGS. 8 and 9. Incidentally, FIGS. 8 and 9 show the change modes when the oil temperature TOIL is equal to or lower than the predetermined temperature TC, that is, at the time of a cold start. Further, the change modes of the valve timing and the engine rotation speed NE in the drawings are shown by way of examples, and subject to change according to the state of the internal combustion engine 10.

As shown in FIG. 8, when the engine start request is made after the engine normal stop and while the valve timing is at the specific timing PM, the cranking accompanied by the fuel injection is started from a point in time T11. Then, the engine rotation speed NE quickly increases from the cranking speed RA by the starter 32 to reach the complete combustion rotation speed NS at a point in time T12 (NE≥NS). Thereby, it is determined as positive in step S140 of the above-described starter driving processing (step S140: YES), and the cranking is stopped (step S150). Further, since the internal combustion engine 10 shifts to the complete combustion state at the point in time T12, that is after the cranking is started (point in time T11) and before a point in time T13 when the first predetermined period α elapses, it is determined as positive in the step S220 of the above-described start-up time processing (step S220: YES).

Meanwhile, as shown in FIG. 9, when an engine start request is made after the engine abnormal stop and while the valve timing is not at the specific timing PM, the cranking accompanied by the fuel injection is started from a point in time T21. Then, the valve timing is gradually and discretely advanced by the alternating torque acting on the camshaft 22 due to the cranking.

However, since the engine rotation speed NE has not reached the complete combustion rotation speed NS (NE<NS) at a point in time T22 when the first predetermined period α has elapsed, the fuel injection by the fuel injection valve 13 is stopped and the fuel injection amount QF is set as zero. Namely, it is determined as negative in step S220 of the above-described start-up time processing (step S220: NO), and the fuel injection is stopped as the start-up failure processing (step S230). Thereby, the valve timing is advanced by the ratchet mechanism while avoiding the adhesion of the unburned fuel to the ignition plug 14.

Thereafter, the fuel injection is kept stopped until a point in time T23, when the second predetermined period β has elapsed. When the fuel injection is restarted and the fuel injection amount QF is changed back to the normal injection amount QA at the point in time T23, the engine rotation speed NE increases gradually from a point in time T24, and the internal combustion engine 10 shifts to the complete combustion state at a point in time T25.

Meanwhile, when the start-up failure processing to stop the fuel injection is not executed at the point in time T22, as shown by lines formed by a long dash alternating with a short dash, the unburned fuel further adheres to the ignition plug 14 during the period when the valve timing is advanced to the specific timing PM. Since this promotes the further deterioration of the engine startability, the engine rotation speed NE does not increase over a long period of time even when the valve timing is advanced to the specific timing PM, which makes it difficult to cause the internal combustion engine 10 to shift to the complete combustion state.

The first embodiment described thus far achieves the following advantages.

(1) At the occurrence of a start-up failure, that is, when the internal combustion engine 10 does not shift to the complete combustion state after the cranking accompanied by the fuel injection is started and before the first predetermined period α elapses (step S220: NO), the start-up failure processing that addresses the state where the valve timing is at the timing different from the specific timing PM is executed (step S230). Therefore, even when the valve timing is not at the specific timing PM at the start of the cranking, the resulting deterioration of the engine startability can be limited. Further, since the fuel injection is started at the same time when the cranking is started (step S200), it is possible to start the internal combustion engine 10 promptly when the valve timing is at the specific timing PM.

(2) The ratchet mechanism is provided to the lock mechanism 48. Therefore, at the time of the relative rotation between the vane rotor 43 and the housing 42 based on the alternating torque acting on the camshaft 22, the valve timing can be discretely advanced to the specific timing PM. For this reason, even when the valve timing is not at the specific timing PM at the start of the cranking, the valve timing can be advanced autonomously to the specific timing PM based on the alternating torque acting on the camshaft 22, which makes it possible to limit the deterioration of the engine startability further preferably.

(3) When a start-up failure of the internal combustion engine 10 is caused, the fuel injection is stopped as the start-up failure processing. This makes it possible to limit further deterioration of the engine startability by frequent occurrence of misfiring caused by the unburned fuel adhered to the ignition plug 14 as a longer period of time is required to complete the engine start-up.

(4) The fuel injection is stopped as the start-up failure processing on condition that the oil temperature TOIL is equal to or lower than the predetermined temperature TC (TOIL≤TC), that is, at the time of a cold start (step S230). This makes it possible to favorably limit the deterioration of the engine startability under circumstances where the deterioration of the engine startability is easily caused.

(5) There is a problem that, immediately after the cranking is started and when the engine rotation speed NE is low, it is difficult to detect the position of the camshaft 22 at an early stage based on the signal of the cam angle sensor 83. Namely, even when the engine is started after engine abnormal stop and when the valve timing is not at the specific timing PM, it is difficult to detect the timing of this valve timing based on the signal of the cam angle sensor 83. According to this embodiment, however, the occurrence of a start-up failure is monitored and the start-up failure processing is executed based on the monitoring result. Therefore, when the valve timing is not at the specific timing PM at the time of starting the cranking, the resulting deterioration of the engine startability can be limited even under the situation where the valve timing cannot be obtained based on the detection result of the cam angle sensor 83.

Second Embodiment

Figure 10:
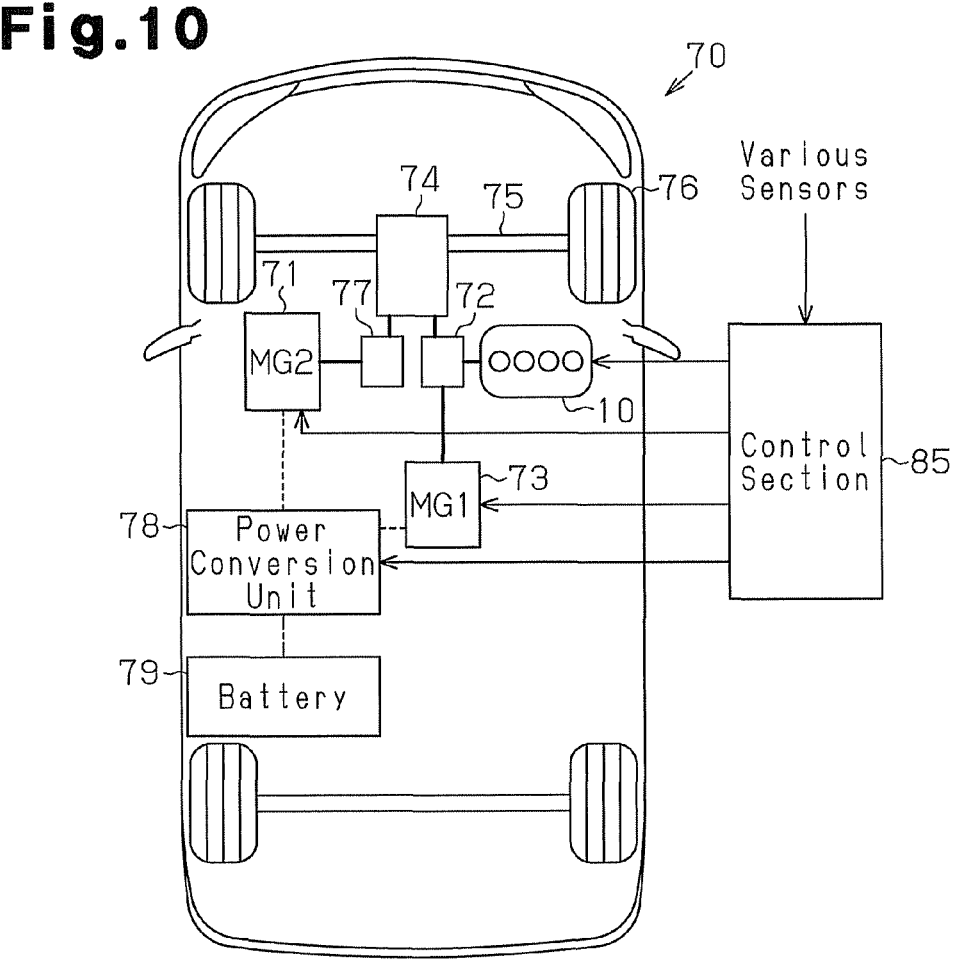
FIG. 10 is a schematic block diagram of a vehicle equipped with an internal combustion engine and a control device for an internal combustion engine according to a second embodiment of this invention.

Next, a control device for an internal combustion engine according to a second embodiment of the present invention will be described with reference to FIGS. 10 to 12, by focusing on differences from the first embodiment. According to this embodiment, the internal combustion engine 10 according to the first embodiment is mounted on a hybrid vehicle 70 as shown in FIG. 10. Incidentally, the same numerals and symbols will be used to designate the same components as those of the first embodiment, and the detailed description will be omitted.

As shown in FIG. 10, the vehicle 70 includes the internal combustion engine 10 and a second motor generator 71 as power sources to rotate drive wheels 76. Power output from the internal combustion engine 10 is transmitted via a power dividing mechanism 72, a speed reducer 74, and an axle 75 to the drive wheels 76. Meanwhile, power output from the second motor generator 71 is transmitted via a motor reduction mechanism 77, the speed reducer 74, and the axle 75 to the drive wheels 76.

The power output from the internal combustion engine 10 is divided by the power dividing mechanism 72 into power transmitted to the drive wheels 76 and power transmitted to a first motor generator 73. The first motor generator 73 uses the power output from the internal combustion engine 10 to generate electric power, and the generated electric power is supplied via a power conversion unit 78 to a battery 79. At the start-up of the internal combustion engine 10, the cranking of the internal combustion engine 10 is executed by power output from the first motor generator 73 based on electric power supplied from the battery 79. Incidentally, the battery 79 of this embodiment corresponds to the battery 33 of the first embodiment. The first motor generator 73 of this embodiment functions as an engine start-up device that forcibly rotates the crankshaft 17 of the internal combustion engine 10, and corresponds to the starter 32 of the first embodiment. The starter 32 is the engine start-up device of which the cranking speed R is fixed at the rotation speed RA, whereas the first motor generator 73 is the engine start-up device of which the cranking speed R is controlled variably.

Meanwhile, the second motor generator 71 outputs the power based on the electric power supplied from the battery 79. The second motor generator 71 generates electric power by rotary power of the drive wheels 76 during braking or deceleration of the vehicle 70, and the generated electric power is supplied via the power conversion unit 78 to the battery 79.

Similarly to the above-described control section 80, a control section 85 monitors the internal combustion engine 10, the motor generators 71 and 73 and the like based on the detection results of the various sensors provided in the vehicle 70, and executes various kinds of control based on the states.

Incidentally, when the alternating torque acting on the camshaft 22 during the cranking causes relative rotation between the vane rotor 43 and the housing 42, the direction of the relative rotation is reversed periodically as described above. Therefore, the state where the lock pins 51 and 61 are at the positions capable of being fitted in the steps 54, 55, 64 and 65 of the recesses 53 and 63, and the state where the lock pins 51 and 61 are at the positions incapable of being fitted therein are repeated.

A period of duration TP during which the lock pins 51 and 61 are at the positions capable of being fitted into the corresponding steps 54, 55, 64 and 65 is defined as a period capable of being fitted TP (refer to FIG. 5), and a period TL required for the lock pins 51 and 61 to be fitted into the corresponding steps 54, 55, 64 and 65 is defined as a period required to be fitted TL.

Then, comparison is made between the period capable of being fitted TP and the period required to be fitted TL. When the period capable of being fitted TP is shorter than the period required to be fitted TL (TP<TL), the lock pins 51 and 61 cannot be fitted into the corresponding steps 54, 55, 64 and 65. In consideration of variations in the period required to be fitted TL, it is easier for the lock pins 51 and 61 to be fitted into the corresponding steps 54, 55, 64 and 65 as the period capable of being fitted TP becomes longer. Namely, the shift to the states shown in FIGS. 4(a) to 4(d) above can be made easily, and the advancement of the valve timing to the specific timing PM can be made easily and promptly via the ratchet mechanism.

Figure 11:
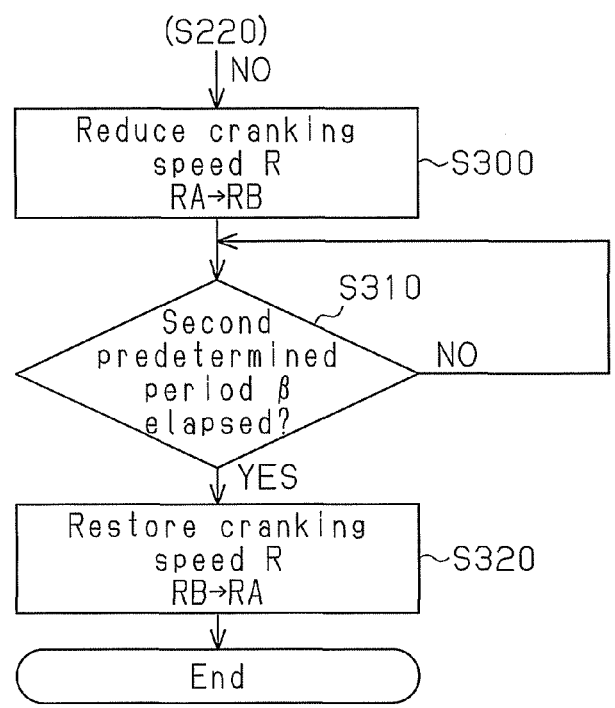
FIG. 11 is a flowchart showing processing procedures of the start-up time processing according to this embodiment.

Therefore, the processes from step S230 in the start-up time processing of the first embodiment shown in FIG. 7 are changed to processes from step S300 shown in FIG. 11 and executed as start-up time processing according to this embodiment. Incidentally, the starter driving processing shown in FIG. 6 is also executed in parallel with the start-up time processing according to this embodiment. Namely, according to this starter driving processing, the cranking is started (step S130) when a start request of the internal combustion engine 10 is made. According to this embodiment, cranking is started by the control section 85 controlling the first motor generator 73. At this time, the rotation speed RA (normal rotation speed RA) suitable for the engine start-up time after the engine normal stop is set as the cranking speed R.

As shown in FIG. 11, when it is determined by the determination process of step S220 in FIG. 6 that the internal combustion engine 10 does not shift to the complete combustion state after the cranking is started and before the first predetermined period α elapses (step S220: NO), it can be determined that a start-up failure is caused. When a start-up failure like this is caused, it can be determined that the valve timing may not be at the specific timing PM at the start of the cranking. In this case, the cranking speed is reduced as the start-up failure processing that addresses the state where the valve timing is at the timing different from the specific timing PM (step S300). Specifically, the first motor generator 73 is controlled so that the cranking speed R becomes a failure rotation speed RB that is slower than the above-described normal rotation speed RA set at the time when a start-up failure is caused. Half of the normal rotation speed RA, for example, is set as the failure rotation speed RB.

When the cranking speed R is reduced like this, a speed of the relative rotation between the vane rotor 43 and the housing 42 changes. As a result of this, the period capable of being fitted TP can be increased, and it becomes easier for the lock pins 51 and 61 to be fitted into the corresponding steps 54, 55, 64 and 65, so that the advancement of the valve timing to the specific timing PM via the ratchet mechanism can be made easily and promptly.

Next, it is determined whether the second predetermined period β has elapsed or not after the reduction in the cranking speed R (step S310). The second predetermined period β is the period that is set in advance and is to be preferably kept in order to allow the valve timing to advance to the specific timing PM when the advancement of the valve timing to the specific timing PM is not made during the above-described first predetermined period α (three seconds, for example). Incidentally, the second predetermined period β according to this embodiment may be the same as or different from the second predetermined period β of the above-described first embodiment.

When it is determined that the second predetermined period β has not elapsed after the reduction in the cranking speed R (step S310: NO), the determination process of step S310 is executed repeatedly at predetermined time intervals until it is determined as positive.

When it is determined from such a determination process that the second predetermined period β has elapsed after the reduction in the cranking speed R (step S310: YES), the cranking speed R is changed back to the normal rotation speed RA (step S320), and this processing is ended.

Next, a description will be given of change modes of the valve timing, the cranking speed R, the engine rotation speed NE, and the fuel injection amount QF at the engine start-up time, when the above-described starter driving processing and the start-up time processing are executed, with reference to FIG. 12. Incidentally, FIG. 12 shows the change modes when an engine start request is made after the engine abnormal stop and when the valve timing is not at the specific timing PM, and at the time of a cold start. Further, the change modes of the valve timing and the engine rotation speed NE in the drawing are shown by way of examples, and subject to change according to the state of the internal combustion engine 10.

Figure 12:
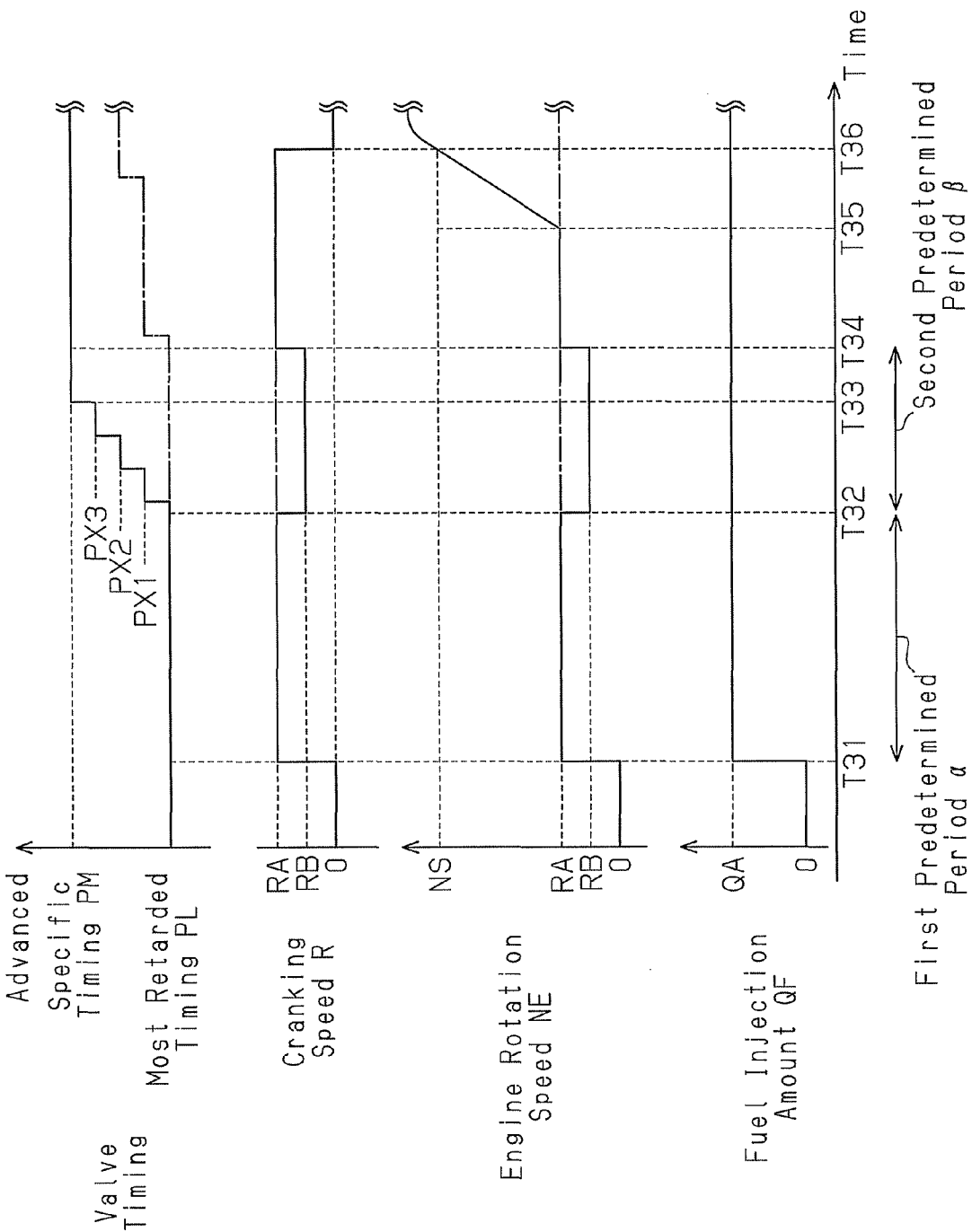
FIG. 12 is a timing chart showing change modes of the valve timing, a cranking speed, the engine rotation speed and the fuel injection amount at the engine start-up time after the engine abnormal stop.

As shown in FIG. 12, cranking accompanied by the fuel injection is started from a point in time T31. At this time, the fuel injection amount QF is set at the normal injection amount QA, and the cranking speed R is set at the normal rotation speed RA.

Since the engine rotation speed NE has not reached the complete combustion rotation speed NS (NE<NS) at a point in time T32, at which the first predetermined period α has elapsed after the cranking is started, the cranking speed R is reduced to the failure rotation speed RB. Namely, since it is determined as negative in step S220 of the above-described start-up time processing (step S220: NO), the cranking speed R by the first motor generator 73 is reduced as the start-up failure processing (step S300). This facilitates the advancement of the valve timing by the ratchet mechanism, and the valve timing is advanced to the specific timing PM at a point in time T33.

At a point in time T34, at which the second predetermined period β has elapsed after the reduction in the cranking speed R, the cranking speed R is changed back to the normal rotation speed RA. Thereafter, the engine rotation speed NE increases from a point in time T35, the internal combustion engine 10 reaches the complete combustion state at a point in time T36, and then the cranking is stopped.

Meanwhile, when the start-up failure processing to reduce the cranking speed R is not executed at the point in time T32, the advancement of the valve timing requires a longer period of time as shown by lines formed by a long dash alternating with a short dash. As a result of this, a longer period of time is required before the cranking can be executed while the valve timing is at the specific timing PM. This makes it difficult for the internal combustion engine 10 to shift to the complete combustion state.

The second embodiment described thus far can obtain not only the advantages described in (1), (2), (4) and (5) above, but also the following advantage.

(6) When a start-up failure of the internal combustion engine 10 is caused (step 220: NO), the cranking speed R is reduced from the normal rotation speed RA (the cranking speed of when a start-up failure is caused) to the failure rotation speed RB as the start-up failure processing (step S300). Thereby, it is possible to make the prompt shift to the state where the valve timing is locked at the specific timing PM via the ratchet mechanism. As a result of this, the cranking with the valve timing capable of starting the engine can be executed at an earlier stage.

Third Embodiment

Next, a control device for an internal combustion engine according to a third embodiment of the present invention will be described with reference to FIG. 13, by focusing on differences from the first embodiment. According to this embodiment, an ignition switch 90 shown in FIG. 1 is provided instead of the engine switch 81 of the first embodiment shown in FIG. 1. The ignition switch 90 outputs a signal corresponding to four switching positions (on, off, accessory, start) of an ignition key (illustration omitted), which is switched by the driver. The starter 32 is driven by the start signal STSW transmitted from the ignition switch 90. In other words, the starter 32 is driven while the ignition key is switched to the start position by the driver. Further, according to this embodiment, start-up time processing as shown in FIG.

13 is executed instead of the starter driving processing of the first embodiment shown in FIG. 6 and the start-up time processing shown in FIG. 7.

Figure 13:
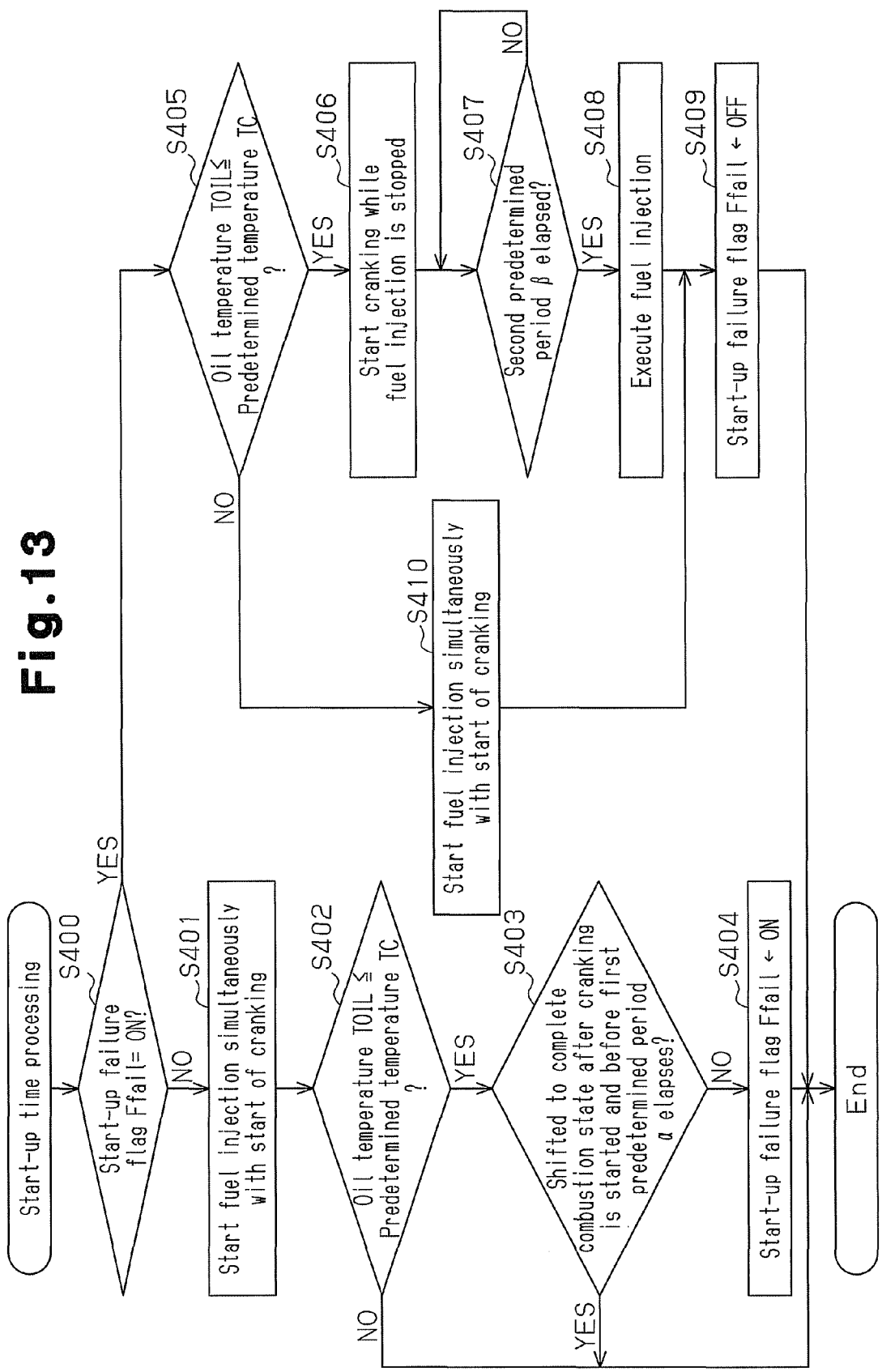
FIG. 13 is a flowchart showing processing procedures of start-up time processing according to a third embodiment of the present invention.
Figure 14A:
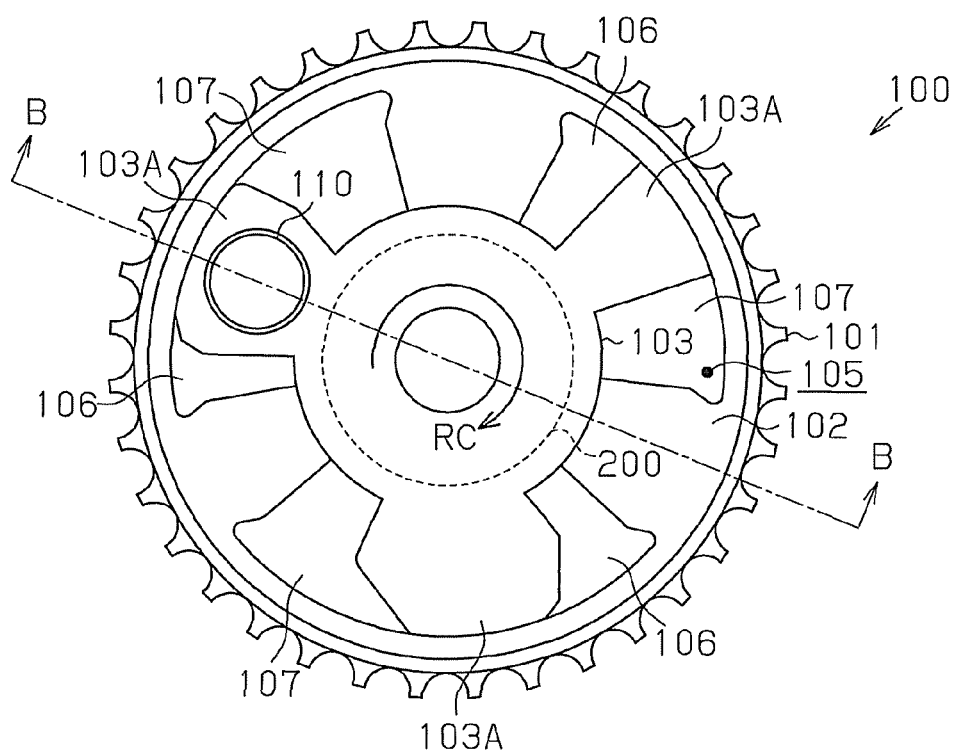
FIG. 14(a) is an end view showing the internal structure of a conventional and general variable valve device.
Figure 14B:
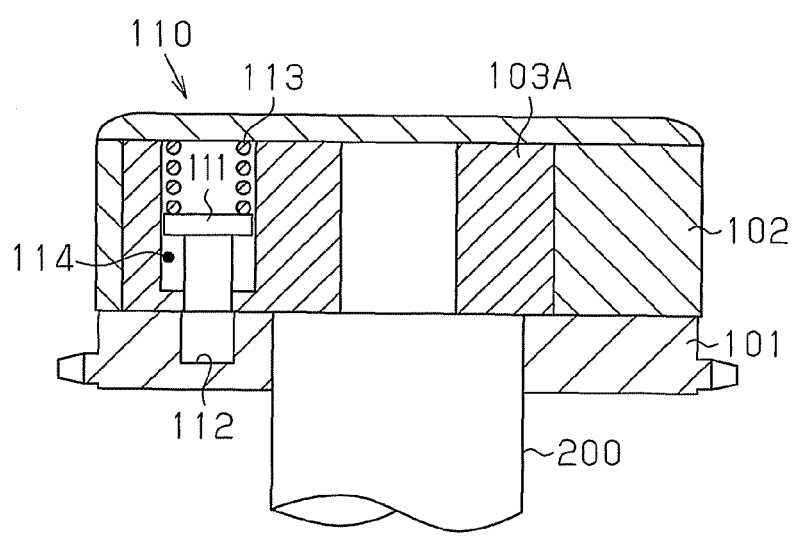
FIG. 14(b) is a cross-sectional view showing the cross-sectional structure taken along line B-B in FIG. 14(a).

The start-up time processing as shown in FIG. 13 is started once each time the ignition key is switched to the on position by the driver.

In this processing, it is first determined whether a start-up failure flag Ffail is ON or not (step S400). Specifically, it is determined by referring to start-up failure flag Ffail information stored in the memory 80A. The initial value of the start-up failure flag Ffail is set as OFF.

When it is determined that the start-up failure flag Ffail is OFF (step S400: NO), the fuel injection is started simultaneously with the start of the cranking (step S401). Specifically, the cranking is started by the starter 32 as the start signal STSW is transmitted from the ignition switch 90. Simultaneously with the start of the cranking, the fuel injection is started by the fuel injection valve 13. At this time, the cranking speed R is set at the rotation speed RA. Further, the fuel injection amount QF is set at the normal injection amount QA.

Subsequently, it is determined whether the oil temperature TOIL is equal to or lower than the predetermined temperature TC (TOIL≤TC) or not (step S402). The process of this step is the same as the process of the above-described step S210. When it is determined that the oil temperature TOIL is higher than the predetermined temperature TC (TOIL>TC) (step S402: NO), this processing is ended because it can be determined that the engine start-up can highly probably be completed, even though the valve timing is not at the specific timing PM.

Meanwhile, when it is determined that the oil temperature TOIL is equal to or lower than the predetermined temperature TC (TOIL≤TC) (step S402: YES), it is then determined whether the internal combustion engine 10 has shifted to the complete combustion state or not after the cranking is started and before the first predetermined period α elapses (step S403). Specifically, when it is determined that the engine rotation speed NE has reached the complete combustion rotation speed NS (NE≥NS) before the first predetermined period α elapses, based on the detection result of the crank angle sensor 82, it is determined that the internal combustion engine 10 has shifted to the complete combustion state.

When it is determined as positive in the process of step S403 (step S403: YES), the determination can be made that the engine start-up is completed in a favorable manner, and the processing is ended.

Meanwhile, when it is determined that the internal combustion engine 10 has not shifted to the complete combustion state (NE<NS) after the cranking is started and before the first predetermined period α elapses (step S403: NO), the determination can be made that a start-up failure has been caused. Therefore, the start-up failure flag Ffail is set as ON (step S404), and the processing is ended. This start-up failure flag Ffail is stored in the memory 80A of the control section 80. This memory 80A functions as storage means that stores a history of start-up failures when caused. When the ignition key is switched by the driver to the position different from the start position, the starter 32 is stopped and the cranking is stopped.

When the ignition key is switched by the driver and the determination process from step S400 is started again, it is determined as positive in the determination process of step S400 (step S400: YES). Thereby, the processing moves to step S405 to determine whether the oil temperature TOIL is equal to or lower than the predetermined temperature TC or not (TOIL≤TC) (step S405). The process of step S405 is the same as the process of the above-described step S402.

When it is determined that the oil temperature TOIL is equal to or lower than the predetermined temperature TC (TOIL≤TC) (step S405: YES), the cranking is started while the fuel injection is stopped (step S406). Namely, the memory 80A stores that the start-up failure flag Ffail is ON as the history of the start-up failure caused at the time of the previous engine start-up. Hence the fuel injection is stopped as the start-up failure processing from when the cranking is started. Specifically, when the start signal STSW is transmitted from the ignition switch 90, the fuel injection amount QF is set as zero and, at the same time, the starter 32 is driven, the cranking speed R is set at the rotation speed RA, and the cranking is started.

Next, it is determined whether the second predetermined period β has elapsed or not after the fuel injection is stopped (step S407). The determination process of this step is the same as the determination process of the above-described step S240 (refer to FIG. 7).

When it is determined that the second predetermined period β has not elapsed after the fuel injection is stopped (step S407: NO), the determination process of step S407 is executed repeatedly at predetermined time intervals until it is determined as positive.

When it is determined from such a determination process that the second predetermined period β has elapsed after the fuel injection is stopped (step S407: YES), the fuel injection is executed (step S408). Namely, the fuel injection amount QF is set at the normal injection amount QA. Then, the start-up failure flag Ffail is set as OFF as its initial value (step S409), this information is stored in the memory 80A, and this processing is ended.

Incidentally, when it is determined in the determination process of the above-described step S405 that the oil temperature TOIL is higher than the predetermined temperature TC (TOIL>TC) (step S405: NO), the determination can be made that, even though a start-up failure was caused in the previous engine start-up and the start-up failure flag Ffail is set as ON, the engine start-up at this time is not a cold start for some reason, such as a rise in the outer air temperature and the like. Therefore, the fuel injection is started simultaneously with the start of the cranking (step S410), the start-up failure flag Ffail is set as OFF as its initial value (step S409), and this processing is ended.

When the ignition key is switched by the driver to the position different from the start position after the cranking is started in step S401 and before the above-described first predetermined period α elapses, the starter 32 is stopped to stop the cranking, and the start-up time processing as shown in FIG. 13 is ended.

According to the third embodiment as described thus far, it is possible to obtain the advantages described in (1) to (5) above.

Other Embodiments

The control device for an internal combustion engine according to the present invention is not limited to the configuration illustrated in the above-described embodiments, and may modified as follows, for example, in which the embodiments are modified as needed.

The setting modes of the first predetermined period α, the second predetermined period β, the fixed period TS, the predetermined temperature TC and the like of the above-described embodiments are shown by way of examples, and may be modified as needed.

The above-described embodiments show examples in which the oil temperature TOIL is obtained based on the detection result of the water temperature sensor 84 and, when the oil temperature TOIL is equal to or lower than the predetermined temperature TC (TOIL≤TC), it is determined that the temperature of the engine is equal to or lower than the predetermined temperature that is set in advance, that is, it is determined to be a cold start. However, the method for determining a cold start is not limited to the above example. For example, a cold start may be determined by providing an oil temperature sensor that detects the oil temperature TOIL, or by comparing the engine cooling water temperature TW with a predetermined temperature that is set in advance.

The first embodiment and the third embodiment show examples of stopping the fuel injection as the start-up failure processing. However, when it is determined that the start-up failure has been caused, a fuel injection amount QB (QB<QA), of which the amount is smaller than the fuel injection amount (normal injection amount) QA of when the start-up failure is caused, can be set as the fuel injection amount QF. In this case, it is also possible to reduce the amount of the unburned fuel adhered to the ignition plug 14, and hence the above-described advantages can be obtained.

Further, the reduction amount of the fuel injection amount QF when it is determined that a start-up failure has been caused may be constant, or may be desirably changed according to the oil temperature TOIL. As the oil temperature TOIL becomes higher, its viscosity becomes lower. Therefore, the resisting force of the hydraulic oil caused at the time of the relative rotation between the housing 42 and the vane rotor 43 is reduced. Then, the amount of the relative rotation between the housing 42 and the vane rotor 43 caused when the alternating torque acts on the camshaft 22 is increased, and the time required to autonomously change the valve timing to the specific timing PM via the ratchet mechanism is reduced. Meanwhile, when the reduction amount of the fuel injection amount QF is reduced, the torque acting on the crankshaft 17 via combustion explosion of the injected fuel and allowing the crankshaft 17 to rotate is increased, and it becomes easier for the internal combustion engine 10 to shift to the complete combustion state. Therefore, the period from when the cranking is started until when the internal combustion engine 10 shifts to the complete combustion state can be reduced, while limiting the further deterioration of the engine startability due to the adhesion of the unburned fuel to the ignition plug 14, by reducing the reduction amount of the fuel injection amount QF, as the oil temperature TOIL is higher, that is, as the period required to autonomously change the valve timing to the specific timing PM via the ratchet mechanism is shorter.

The degree of reduction in the cranking speed R in the second embodiment is also shown by way of example, and may be changed as needed. Specifically, it is desirable to determine the preferable degree of reduction in the cranking speed R by taking into account the degree of contribution made by the degree of reduction in the cranking speed R to the autonomous change in the valve timing via the ratchet mechanism, and also the degree of influence by the same on the efficiency in increase of the engine rotation speed NE by the cranking.

Further, when it is determined that a start-up failure has been caused, the degree of reduction in the cranking speed R may be constant, or may be desirably changed according to the oil temperature TOIL. Namely, as the degree of reduction in the cranking speed R is increased, the autonomous shift of the valve timing to the specific timing PM via the ratchet mechanism becomes easier. Meanwhile, as the degree of reduction in the cranking speed R is reduced, the shift of the internal combustion engine 10 to the complete combustion state becomes easier. Therefore, the valve timing can be changed by the ratchet mechanism more promptly and at the same time, the period from when the cranking is started until when the internal combustion engine 10 shifts to the complete combustion state can be reduced, by reducing the degree of reduction in the cranking speed R, as the oil temperature TOIL becomes higher, that is, as the period required for the autonomous change of the valve timing to the specific timing PM via the ratchet mechanism becomes shorter. For example, when the oil temperature TOIL is higher than that of the second embodiment, the degree of reduction in the cranking speed R can be set to be smaller than the degree of reduction of the second embodiment.

The above-described embodiments show examples of executing either reduction in the fuel injection amount QF or reduction in the cranking speed R, as the start-up failure processing. However, both of the reduction in the fuel injection amount QF and the reduction in the cranking speed R may be executed when it is determined that a start-up failure has been caused. In this case, the valve timing can be promptly changed to the specific timing PM, while limiting the further deterioration of the engine startability due to the unburned fuel adhered to the ignition plug 14, so that the internal combustion engine 10 can be shifted to the complete combustion state more easily.

The above-described embodiments show examples of executing the monitoring of the occurrence of a start-up failure and the start-up failure processing at the time of a cold start. Meanwhile, it is possible to execute monitoring of the occurrence of a start-up failure and the start-up failure processing regardless of whether a cold start is performed or not. In this case, it is also possible to obtain the advantages as shown in (1) to (3), (5) and (6) above.

The above-described embodiments show examples of changing the value of the fuel injection amount QF or the cranking speed R back to its normal value after the start-up failure processing is executed for the second predetermined period β, and ending the start-up time processing as shown in FIG. 7, 11 or 13. However, it is also possible to monitor whether the internal combustion engine 10 shifts to the complete combustion state or not once again after the start-up failure processing is executed and the value of the fuel injection amount QF or the cranking speed R is changed back to its normal value.

The above-described second embodiment shows an example in which the internal combustion engine 10 is mounted on the hybrid vehicle 70, and the cranking speed R is variably controlled by the first motor generator 73 of the hybrid vehicle 70. However, even when only the internal combustion engine 10 is mounted thereon as the drive source of the vehicle, it is possible to execute the processing to reduce the cranking speed R as the start-up failure processing, by providing the starter 32 capable of changing the cranking speed R.

The above-described embodiments show examples of forming the ratchet mechanism as the mechanism to advance the valve timing that is at the more retarded side than the specific timing PM. However, the ratchet mechanism may be formed to have not only the above-described mechanism but also a mechanism to retard the valve timing that is at the more advanced side than the specific timing PM.

The above-described embodiments show examples of forming the lock mechanism 48 by the advancement lock mechanism 50 and the retardation lock mechanism 60. However, the lock mechanism 48 may be formed by a single lock mechanism. By forming the steps having different depths in a recess, it is also possible to form a ratchet mechanism that is formed by the lock pin and the steps and is capable of changing the valve timing autonomously. Thus, the above-described advantages can be obtained.

It is also possible not to provide the ratchet mechanism in the lock mechanism of the variable valve device. In this case, it is possible to obtain at least the advantage shown in (1) above.

The above-described embodiments show examples of supplying the hydraulic oil to the variable valve device 20 by the oil pump 30. Meanwhile, the present invention may be embodied as a variable valve device as shown in, for example, Japanese Laid-Open Patent Publication No. 2004-108370, that is, a control device for an internal combustion engine including a variable valve device of a hydraulically operated type, with which a valve timing is variably controlled by a pressure of hydraulic oil that is supplied to and drained from an advancement chamber and a retardation chamber based on cam torque fluctuation.

According to the above-described embodiments, examples of forming the recesses 53 and 63 in the cover 40 are shown, but the recesses 53 and 63 may be formed in the sprocket 41.

The above-described embodiments show examples in which the lock pins 51 and 61 formed in the vane rotor 43 reciprocate between the frontal side ZA and the basal side ZB, and the recesses 53 and 63, into which the lock pins 51 and 61 are respectively fitted, are formed in the cover 40. Meanwhile, a configuration may be employed in which a lock pin is provided to project from the outer periphery of the vane rotor 43 and a recess, into which the lock pin is fitted, is provided on the inner periphery of the housing 42.

The above-described embodiments show examples in which the sprocket 41 is drivingly connected to the crankshaft 17 and the vane rotor 43 is drivingly connected to the camshaft 22. However, the variable valve device 20 may be structured in such a manner that the sprocket 41 is drivingly connected to the camshaft 22, and the vane rotor 43 is drivingly connected to the crankshaft 17. In this case, it is also possible to obtain the above-described advantages.

The above-described embodiments employ as the lock mechanism 48 (fixation mechanism) a structure that mechanically locks the valve timing at the specific timing by allowing the lock pins to be fitted into the recesses to limit the relative rotation between the first rotating body and the second rotating body. However, a fixation mechanism of an electric type may be employed. In this case, the problem of the deterioration of the engine startability is caused when the valve timing is not at the specific timing at the start of the cranking. Therefore, when the present invention is applied, at least the advantage in (1) above is obtained.

The above-described embodiments employ the variable mechanism 20A of the hydraulically operated type that changes the valve timing by allowing the relative rotation between the first rotating body and the second rotating body based on the hydraulic pressure of the hydraulic oil. However, a variable mechanism of an electric type may be employed. In this case, the problem of the deterioration of the engine startability is caused when the valve timing is not at the specific timing at the start of the cranking. Therefore, when the present invention is applied, at least the advantage in (1) above can be obtained.

The above-described embodiments show examples of embodying the control device for an internal combustion engine including the variable valve device 20 that changes the valve timing of the intake valve 21. However, the present invention may also be embodied as a control device for an internal combustion engine including the variable valve device that changes the valve timing of the exhaust valve 23. Further, the present invention may also be embodied as the control device for an internal combustion engine including both of the variable valve device that changes the valve timing of the intake valve 21 and the variable valve device that changes the valve timing of the exhaust valve 23.

DESCRIPTION OF THE REFERENCE NUMERALS

10 . . . internal combustion engine, 10A . . . cylinder, 11 . . . piston, 12 . . . combustion chamber, 13 . . . fuel injection valve, 14 . . . ignition plug, 15 . . . intake passage, 16 . . . exhaust passage, 17 . . . crankshaft, 20, 100 . . . variable valve device, 20A . . . variable mechanism, 21 . . . intake valve, 22, 200 . . . intake camshaft, 23 . . . exhaust valve, 24 . . . exhaust camshaft, 25 . . . oil control valve, 26 . . . hydraulic oil passage, 30 . . . oil pump, 31 . . . oil pan, 32 . . . starter (engine start-up device), 33 . . . battery, 40 . . . cover (second rotating body), 41, 101 . . . sprocket (second rotating body), 42, 102 . . . housing (second rotating body), 43, 103 . . . vane rotor (first rotating body), 43A . . . boss, 43B, 103A . . . vane, 44 . . . partition, 45, 105 . . . housing chamber, 46, 106 . . . advancement chamber, 47, 107 . . . retardation chamber, 48, 110 . . . lock mechanism (fixation mechanism), 50 . . . advancement lock mechanism, 51 . . . first lock pin, 52 . . . first spring, 53 . . . first recess, 54 . . . first upper-step, 55 . . . first lower-step, 56, 66 . . . vane hole, 57 . . . first release chamber, 58 . . . first spring chamber, 60 . . . retardation lock mechanism, 61 . . . second lock pin, 62 . . . second spring, 63 . . . second recess, 64 . . . second upper-step, 65 . . . second lower-step, 67 . . . second release chamber, 68 . . . second spring chamber, 70 . . . hybrid vehicle, 71 . . . second motor generator, 72 . . . power dividing mechanism, 73 . . . first motor generator (engine start-up device), 74 . . . speed reducer, 75 . . . axle, 76 . . . drive wheel, 77 . . . motor reduction mechanism, 78 . . . power conversion unit, 79 . . . battery, 80, 85 . . . control section (control device), 80A . . . memory, 81 . . . engine switch, 82 . . . crank angle sensor, 83 . . . cam angle sensor, 84 . . . water temperature sensor, 90 . . . ignition switch, 111 . . . lock pin, 112 . . . recess, 113 . . . spring, 114 . . . release chamber.

The invention claimed is:

1. A control device for an internal combustion engine, wherein the engine includes a variable valve device, which includes:

a variable mechanism having a first rotating body, which rotates in synchronization with one of a crankshaft and a camshaft, and a second rotating body, which rotates in synchronization with the other, the variable mechanism rotating the rotating bodies relative to each other to change a valve timing of a valve driven by the camshaft to open and close, and a fixation mechanism capable of fixing the valve timing at a specific timing that is between a most retarded timing and a most advanced timing by limiting the relative rotation between the rotating bodies, wherein a period elapsed from when cranking accompanied by fuel injection is started is defined as a post-start period, the control device is configured to execute start-up failure processing, which addresses a state where the valve timing is at a timing different from the specific timing, when the post-start period is equal to or longer than a first predetermined period α and an engine rotation speed is equal to or slower than a predetermined value, that is, when a start-up failure is caused in which the internal combustion engine does not shift to a complete combustion state, and the start-up failure processing reduces a fuel injection amount after when it is determined that a start-up failure has been caused to be smaller than the fuel injection amount of when it is determined that a start-up failure has been caused.

2. The control device for an internal combustion engine according to claim 1, wherein the variable mechanism changes the valve timing by rotating the rotating bodies relative to each other based on a hydraulic pressure of hydraulic oil, and the fixation mechanism includes a lock pin provided in the first rotating body and a recess provided in the second rotating body, into which the lock pin is fitted, the fixation mechanism causes the lock pin to fit into the recess to mechanically lock the relative rotation between the rotating bodies, thereby locking the valve timing at the specific timing, and the fixation mechanism pulls out the lock pin from the recess to allow the rotating bodies to rotate relative to each other.

3. A control device for an internal combustion engine, wherein the engine includes a variable valve device, which includes:

a variable mechanism having a first rotating body, which rotates in synchronization with one of a crankshaft and a camshaft, and a second rotating body, which rotates in synchronization with the other, the variable mechanism rotating the rotating bodies relative to each other to change a valve timing of a valve driven by the camshaft to open and close, and a fixation mechanism capable of fixing the valve timing at a specific timing that is between a most retarded timing and a most advanced timing by limiting the relative rotation between the rotating bodies, wherein the variable mechanism changes the valve timing by rotating the rotating bodies relative to each other based on a hydraulic pressure of hydraulic oil, the fixation mechanism includes a lock pin provided in the first rotating body and a recess provided in the second rotating body, into which the lock pin is fitted, the fixation mechanism causes the lock pin to fit into the recess to mechanically lock the relative rotation between the rotating bodies, thereby locking the valve timing at the specific timing, the fixation mechanism pulls out the lock pin from the recess to allow the rotating bodies to rotate relative to each other, a period elapsed from when the cranking accompanied by fuel injection is started is defined as a post-start period, the control device is configured to execute start-up failure processing, which addresses a state where the valve timing is at a timing different from the specific timing, when the post-start period is equal to or longer than a first predetermined period α and an engine rotation speed is equal to or slower than a predetermined value, that is, when a start-up failure is caused in which the internal combustion engine does not shift to a complete combustion state, and the start-up failure processing reduces a cranking speed after when it is determined that a start-up failure has been caused to be slower than the cranking speed of when it is determined that a start-up failure has been caused, the cranking speed being a speed at which the crankshaft is rotated by an engine start-up device.

4. The control device for an internal combustion engine according to claim 2, wherein, during execution of the cranking, the fixation mechanism changes the valve timing from the timing different from the specific timing to the specific timing.

5. The control device for an internal combustion engine according to claim 4, wherein the recess is arranged in a circumferential direction of the second rotating body and has a plurality of steps with different depths, and the steps and the lock pin function as a ratchet mechanism, which discretely changes the valve timing from the timing different from the specific timing to the specific timing as the lock pin fits into the steps sequentially by the relative rotation between the rotating bodies, which is made based on alternating torque acting on the camshaft.

6. The control device for an internal combustion engine according to claim 1, wherein the control device is configured to execute the start-up failure processing on condition that a cold start is being performed, in which an engine temperature is equal to or lower than a predetermined temperature set in advance.

7. The control device for an internal combustion engine according to claim 1, the control device further comprising a memory to store a history of a start-up failure when it is caused, wherein, on condition that the history of a start-up failure in the previous engine start-up is stored in the memory, the control device is configured to execute the start-up failure processing from when the cranking is started in the next engine start-up.

8. The control device for an internal combustion engine according to claim 3, wherein, during execution of the cranking, the fixation mechanism changes the valve timing from the timing different from the specific timing to the specific timing.

9. The control device for an internal combustion engine according to claim 8, wherein the recess is arranged in a circumferential direction of the second rotating body and has a plurality of steps with different depths, and the steps and the lock pin function as a ratchet mechanism, which discretely changes the valve timing from the timing different from the specific timing to the specific timing as the lock pin fits into the steps sequentially by the relative rotation between the rotating bodies, which is made based on alternating torque acting on the camshaft.

10. The control device for an internal combustion engine according to claim 3, wherein the control device is configured to execute the start-up failure processing on condition that a cold start is being performed, in which an engine temperature is equal to or lower than a predetermined temperature set in advance.

11. The control device for an internal combustion engine according to claim 3, the control device further comprising a memory to store a history of a start-up failure when it is caused, wherein, on condition that the history of a start-up failure in the previous engine start-up is stored in the memory, the control device is configured to execute the start-up failure processing from when the cranking is started in the next engine start-up.

* * * * *